United States Patent
Devine et al.

(10) Patent No.: US 11,968,265 B2
(45) Date of Patent: *Apr. 23, 2024

(54) SYSTEMS AND METHODS FOR ASYNCHRONOUS API-DRIVEN EXTERNAL APPLICATION SERVICES FOR A BLOCKCHAIN

(71) Applicant: The Travelers Indemnity Company, Hartford, CT (US)

(72) Inventors: William K. Devine, Avon, CT (US); Emma J. Scopino, New Hartford, CT (US); Robert W. Jenkins, Tolland, CT (US); Vinod Srinivasan, Avon, CT (US)

(73) Assignee: The Travelers Indemnity Company, Hartford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/331,111

(22) Filed: Jun. 7, 2023

(65) Prior Publication Data
US 2023/0319146 A1 Oct. 5, 2023

Related U.S. Application Data

(63) Continuation of application No. 17/899,829, filed on Aug. 31, 2022, now Pat. No. 11,711,433, which is a
(Continued)

(51) Int. Cl.
*H04L 67/133* (2022.01)
*G06Q 10/063* (2023.01)
(Continued)

(52) U.S. Cl.
CPC ........ *H04L 67/133* (2022.05); *G06Q 10/063* (2013.01); *H04L 9/0637* (2013.01); *H04L 9/3234* (2013.01); *H04L 67/306* (2013.01); *H04L 67/562* (2022.05); *G06Q 10/0635* (2013.01); *G06Q 40/08* (2013.01); *H04L 9/50* (2022.05); *H04L 67/10* (2013.01)

(58) Field of Classification Search
None
See application file for complete search history.

(56) References Cited

U.S. PATENT DOCUMENTS 11,245,691 B1 * 2/2022 Dods .................. G06F 18/23
2019/0104196 A1 * 4/2019 Li ........................ H04L 9/0637
(Continued)

OTHER PUBLICATIONS

Office Action for U.S. Appl. No. 16/928,341 dated Feb. 23, 2022; 11 pps.
(Continued)

*Primary Examiner* — Lashonda Jacobs-Burton
(74) *Attorney, Agent, or Firm* — Rowan Tree Law Group, PLLC; Carson C. K. Fincham

(57) ABSTRACT

Systems and methods for asynchronous API-driven external application services for blockchain are provided. The blockchain may store profile data that permits asynchronous communications and data sharing among a plurality of trusted users, and an application server layer may act as a gateway to a blockchain system to selectively provide limited access to external application services to operate upon the blockchain data.

22 Claims, 13 Drawing Sheets

Related U.S. Application Data continuation of application No. 16/928,341, filed on Jul. 14, 2020, now Pat. No. 11,470,158.

(51) Int. Cl.

| | |
|---|---|
| *H04L 9/06* | (2006.01) |
| *H04L 9/32* | (2006.01) |
| *H04L 67/306* | (2022.01) |
| *H04L 67/562* | (2022.01) |
| *G06Q 10/0635* | (2023.01) |
| *G06Q 40/08* | (2012.01) |
| *H04L 9/00* | (2022.01) |
| *H04L 67/10* | (2022.01) |

(56) References Cited

U.S. PATENT DOCUMENTS

| | | | | |
|---|---|---|---|---|
| 2019/0319794 A1* | 10/2019 | Haldar | | H04L 9/3236 |
| 2019/0354607 A1* | 11/2019 | Snow | | H04L 67/535 |
| 2020/0065300 A1* | 2/2020 | Yang | | H04L 9/50 |
| 2020/0134139 A1* | 4/2020 | Vaish | | G06F 16/1805 |
| 2020/0311307 A1* | 10/2020 | Levy | | G06F 21/6254 |
| 2020/0358784 A1* | 11/2020 | Khaund | | H04L 9/3239 |
| 2021/0029194 A1* | 1/2021 | Kurian | | H04L 67/104 |
| 2021/0295353 A1* | 9/2021 | Lee | | H04L 9/3239 |
| 2021/0337023 A1* | 10/2021 | Yang | | H04L 9/3239 |
| 2021/0390196 A1* | 12/2021 | Lavine | | H04L 63/102 |
| 2021/0392131 A1* | 12/2021 | Svede | | H04L 63/0807 |

OTHER PUBLICATIONS

Notice of Allowance for U.S. Appl. No. 16/928,341 dated Jun. 2, 2022; 6 pps.

Notice of Allowance for U.S. Appl. No. 17/899,829 dated Mar. 29, 2023; 8 pps.

\* cited by examiner

SYSTEMS AND METHODS FOR ASYNCHRONOUS API-DRIVEN EXTERNAL APPLICATION SERVICES FOR A BLOCKCHAIN

CROSS-REFERENCE TO RELATED APPLICATIONS

Benefit and priority under 35 U.S.C. § 120 is hereby claimed to, and this is a Continuation of, U.S. patent application Ser. No. 17/899,829 filed on Aug. 31, 2022 and titled "SYSTEMS AND METHODS FOR ASYNCHRONOUS API-DRIVEN EXTERNAL APPLICATION SERVICES FOR A BLOCKCHAIN", which issued as U.S. Pat. No. 11,711,433 on Jul. 25, 2023 and which itself claims benefit and priority to U.S. patent application Ser. No. 16/928,341 filed on Jul. 14, 2020 and titled "SYSTEMS AND METHODS FOR ASYNCHRONOUS API-DRIVEN EXTERNAL APPLICATION SERVICES FOR A BLOCKCHAIN", which issued as U.S. Pat. No. 11,470,158 on Jul. 14, 2020, each of which is hereby incorporated by reference herein in its entirety.

BACKGROUND

Advances in distributed electronic ledger capabilities (e.g., "blockchain") are now being leveraged to provide for secure electronic transactions in a variety of industries. Some implementations are utilized to replace legacy paper ledger or outdated electronic ledger systems, while other implementations seek to introduce new capabilities by reimagining process flows to implement blockchain features. Despite the advantages of implementing blockchain systems, such implementations must typically be customized for each particular industry process and are often limited to a handful of conceptual designs that either reduce functionality or increase security risks.

BRIEF DESCRIPTION OF THE DRAWINGS

The figures depict embodiments for purposes of illustration only. One skilled in the art will readily recognize from the following description that alternative embodiments of the systems and methods illustrated herein may be employed without departing from the principles described herein, wherein.

DETAILED DESCRIPTION

I. Introduction

Figure 1:
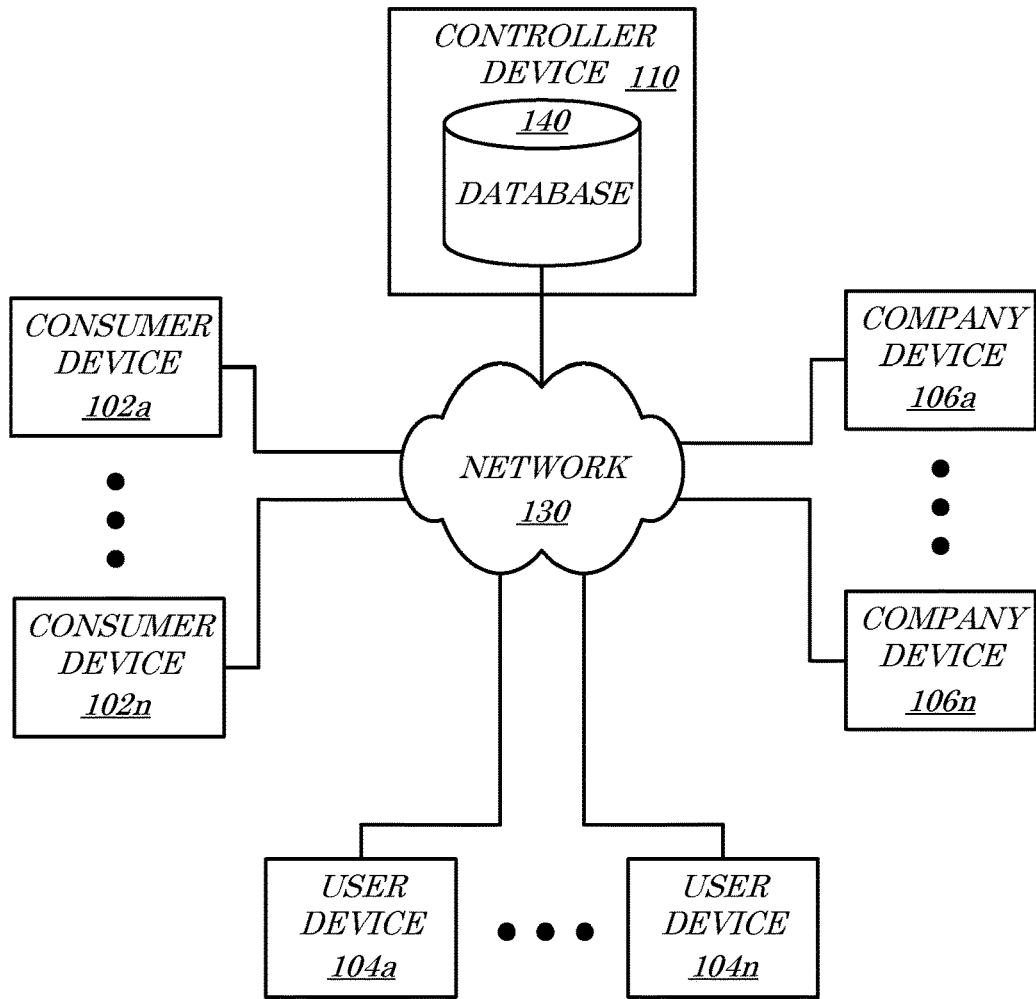
FIG. 1 is a block diagram of a system according to some embodiments.

The two primary types of blockchain conceptual designs are (i) public blockchain and (ii) private (or enterprise) blockchain. Public blockchains comprise open networks of distributed ledger data storage that permit access to any user that utilizes the correct protocol. The higher the number of nodes (e.g., user devices) that participate in a public blockchain, the more distributed copies of the "chain" of ledger blocks exist, and the higher the protection against Distributed Denial-of-Service (DDoS) attacks. Data stored in such a public blockchain, however, is necessarily public. For applications that require maintaining data privacy, such as enterprise business data systems, private blockchain may generally be more appropriate. The credentialing services required to ensure that private blockchain data remains private, however, limit the capabilities of the blockchain by imposing barriers to entry for all users and by increasing functional overhead costs.

In accordance with embodiments herein, these and other deficiencies of previous solutions are remedied by providing systems, apparatus, methods, and articles of manufacture for asynchronous Application Programming Interface (API)-driven external application services for a blockchain. The inventors have realized, for example, that private blockchain systems may be utilized to provide for asynchronous user, customer, and/or consumer communications and/or data sharing services and that such services can be strategically enhanced by providing a system that allows limited and selective access to third-party service providers. Customers/consumers have traditionally been required to provide information to an agent or representative of a company, for example, with the agent/representative then forwarding the acquired information within their organization to provide products or services to the customer/consumer. Feedback or results (such as price quotes, terms of service, etc.) may then be provided back to the customer/consumer through their point-of-contact. These communication paths are serial or synchronous in nature, which decreases process flexibility and introduces delays that may be detrimental to the desired goals.

The inventors have realized that providing for an asynchronous customer/consumer data management platform that utilizes blockchain functionality may provide many benefits. Particularly for relationships/processes that require multiple parties, such as customers/consumers, agents, representatives, third-parties, and/or other users, for example, providing blockchain-enabled asynchronous customer/consumer profile data sharing and access may greatly decrease time delays for the given processes. Managed access blockchain functionality may provide both data security and integrity to each relationship, communication chain, and/or transaction, thus enhancing the benefits of the asynchronous platform. In some embodiments, such an asynchronous blockchain system may provide selective and/or limited access to third-party service providers. The system may, for example, comprise an API services layer that manages user access to the blockchain system and manages permissions and/or subscriptions to third-party services that are selectively given limited access to the blockchain data in furtherance of providing their services. As described in more detail by the non-limiting examples set forth herein, according to some embodiments a third-party service may be given limited access to blockchain (and/or other database) data to perform calculations and/or conduct data modeling, lookups, etc., with the results of the third-party processing being provided to an associated system user. In some embodiments, such external application services may be managed by an API platform or layer that is owned and/or operated by an entity distinct from the users of the system and/or from the blockchain system. In such a manner, for example, the API-driven external application service management provider may act as a portal to the blockchain system.

II. Asynchronous API-Driven Application Services for Blockchain Systems

Referring first to FIG. 1, a block diagram of a system 100 according to some embodiments is shown. In some embodiments, the system 100 may comprise a plurality of consumer devices 102a-n, a plurality of user devices 104a-n, a plurality of company devices 106a-n, a controller device 110, a network 130, and/or a database 140. As depicted in FIG. 1, any or all of the devices 102a-n, 104a-n, 106a-n, 110, 140 (or any combinations thereof) may be in communication via the network 130. In some embodiments, the system 100 may be utilized to provide for an asynchronous API-driven external services platform for a blockchain. The controller device 110 may, for example, interface with one or more of the consumer devices 102a-n, the user devices 104a-n, and/or the company devices 106a-n to selectively provide limited access to third-party services for the blockchain (e.g., a private blockchain).

Fewer or more components 102a-n, 104a-n, 106a-n, 110, 130, 140 and/or various configurations of the depicted components 102a-n, 104a-n, 106a-n, 110, 130, 140 may be included in the system 100 without deviating from the scope of embodiments described herein. In some embodiments, the components 102a-n, 104a-n, 106a-n, 110, 130, 140 may be similar in configuration and/or functionality to similarly named and/or numbered components as described herein. In some embodiments, the system 100 (and/or portion thereof) may comprise an asynchronous API-driven external application services for blockchain program, system, and/or platform programmed and/or otherwise configured to execute, conduct, and/or facilitate the methods 400, 500, 600, 800, 900 of FIG. 4, FIG. 5, FIG. 6, FIG. 8, and/or FIG. 9 herein, and/or portions or combinations thereof.

The consumer devices 102a-n, user devices 104a-n, and/or company devices 106a-n, in some embodiments, may comprise any types or configurations of computing, mobile electronic, network, user, and/or communication devices that are or become known or practicable. The consumer devices 102a-n, user devices 104a-n, and/or company devices 106a-n may, for example, comprise one or more tablet computers, such as an iPad® manufactured by Apple®, Inc. of Cupertino, CA, and/or cellular and/or wireless telephones or "smart" phones, such as an iPhone® (also manufactured by Apple®, Inc.) or an Optimus™ S smart phone manufactured by LG® Electronics, Inc. of San Diego, CA, and running the Android® operating system from Google®, Inc. of Mountain View, CA. According to some embodiments, the consumer devices 102a-n, user devices 104a-n, and/or company devices 106a-n may comprise any combination and/or configuration of electronic devices that store, receive, transmit, provide, and/or process data, such as one or more "smart" cards, RFID and/or NFC cards, chips, and/or other data storage and/or processing objects. In some embodiments, the consumer devices 102a-n, user devices 104a-n, and/or company devices 106a-n may be owned and/or operated by different users and/or classes or groups of users. Ownership and/or operation by one or more entities or groups may be signified and/or defined by different sets of login credentials, identifiers, etc. A first user or group may be privy to, own, be assigned, and/or utilize a first set of login credentials and/or a first identifier that grant access to a first set of access privileges, for example, while a second user or group may be privy to, own, be assigned, and/or utilize a second set of login credentials and/or a second identifier that grant access to a second set of access privileges.

According to some embodiments, the consumer devices 102a-n may comprise devices owned and/or operated by one or more customers, potential customers, and/or consumers that, e.g., each utilize a unique consumer login identifier and/or consumer login credentials. In some embodiments, the user devices 104a-n may comprise devices owned and/or operated by one or more agents, representatives, brokers, third-parties, and/or other users that, e.g., each utilize a unique user login identifier and/or user login credentials. According to some embodiments, the company devices 106a-n may comprise devices owned and/or operated by one or more customer service representatives or agents, sales representatives, underwriters, appraisers, and/or other company personnel that, e.g., each utilize a unique company login identifier and/or company login credentials. According to some embodiments, the user devices 102a-n may communicate with the controller device 110 via the network 104 to conduct various complex and/or multivariate queries, such as underwriting inquiries, e.g., to submit a FNOL and/or resolve a claim of loss, as described herein.

In some embodiments, the consumer devices 102a-n, user devices 104a-n, and/or company devices 106a-n may interface with the controller device 110 to effectuate communications (direct or indirect) with one or more other consumer devices 102a-n, user devices 104a-n, and/or company devices 106a-n (such communication not explicitly shown in FIG. 1) operated by other users, for example. In some embodiments, the consumer devices 102a-n, user devices 104a-n, and/or company devices 106a-n may comprise one or more sensors and/or other data acquisition and/or input devices. In some embodiments, input from such devices 102a-n, 104a-n, 106a-n may be provided to the controller device 110 to be stored in a blockchain managed thereby and/or to be selectively provided to one or more of the other devices 102a-n, 104a-n, 106a-n to permit limited third-party external application access to the blockchain, as described herein.

According to some embodiments, the controller device 110 may comprise an electronic and/or computerized controller device, such as a computer server, communicatively coupled to interface with the consumer devices 102a-n, user devices 104a-n, and/or company devices 106a-n (directly and/or indirectly). The controller device 110 may, for example, comprise one or more PowerEdge™ R830 rack servers manufactured by Dell®, Inc. of Round Rock, TX, which may include one or more Twelve-Core Intel® Xeon® E5-4640 v4 electronic processing devices. In some embodiments, the controller device 110 may comprise a plurality of processing devices specially programmed to execute and/or conduct processes that are not practicable without the aid of the controller device 110. The controller device 110 may, for example, provide managed, API-driven access to a blockchain by enabling external application services for the blockchain, as described herein. In some embodiments, such external services would not being capable of being provided without the benefit of the specially programmed controller 110, particularly without sacrificing the security of the private blockchain data. According to some embodiments, the controller device 110 may be located remotely from one or more of the consumer devices 102a-n, user devices 104a-n, and/or company devices 106a-n. The controller device 110 may also or alternatively comprise a plurality of electronic processing devices located at one or more various sites and/or locations.

According to some embodiments, the controller device 110 may store and/or execute specially programmed instructions to operate in accordance with embodiments described herein. The controller device 110 may, for example, execute one or more API, Artificial Intelligence (AI), neural network, and/or other programs, modules, and/or routines that facilitate the provision of permission-based data sharing and external application access to blockchain data. According to some embodiments, the controller device 110 may comprise a computerized processing device, such as a computer server and/or other electronic device, to manage and/or facilitate queries and/or communications regarding the consumer devices 102a-n, user devices 104a-n, and/or company devices 106a-n. The controller device 110 may be utilized, for example, to: (i) receive and verify or authenticate various identifiers and/or login credentials provided by any or all of the consumer devices 102a-n, user devices 104a-n, and/or company devices 106a-n, (ii) lookup and/or retrieve data stored in association with the received identifiers and/or login credentials, (iii) identify, manage, and/or verify or authenticate data access permissions, (iv) identify, manage, and/or verify or authenticate one or more third-party external applications, (v) provide limited blockchain access to the one or more third-party external applications, and/or (vi) manage and/or apply fees for the use of the one or more third-party external applications, as described herein.

The network 130 may, according to some embodiments, comprise a Local Area Network (LAN; wireless and/or wired), cellular telephone, Bluetooth® and/or Bluetooth Low Energy (BLE), Near Field Communication (NFC), and/or Radio Frequency (RF) network with communication links between the controller device 110, the consumer devices 102a-n, user devices 104a-n, company devices 106a-n, and/or the database 140. In some embodiments, the network 130 may comprise direct communication links between any or all of the components 102a-n, 104a-n, 106a-n, 110, 140 of the system 100. The consumer devices 102a-n, user devices 104a-n, and/or company devices 106a-n may, for example, be directly interfaced or connected to the controller device 110 via one or more wires, cables, wireless links, and/or other network components, such network components (e.g., communication links) comprising portions of the network 130. In some embodiments, the network 130 may comprise one or many other links or network components other than those depicted in FIG. 1. The consumer devices 102a-n, user devices 104a-n, and/or company devices 106a-n may, for example, be connected to the controller device 110 via various cell towers, routers, repeaters, ports, switches, and/or other network components that comprise the Internet and/or a cellular telephone (and/or Public Switched Telephone Network (PSTN)) network, and which comprise portions of the network 130.

While the network 130 is depicted in FIG. 1 as a single object, the network 130 may comprise any number, type, and/or configuration of networks that is or becomes known or practicable. According to some embodiments, the network 130 may comprise a conglomeration of different sub-networks and/or network components interconnected, directly or indirectly, by the components 102a-n, 104a-n, 106a-n, 110, 140 of the system 100. The network 130 may comprise one or more cellular telephone networks with communication links between the consumer devices 102a-n and the controller device 110, for example, and/or may comprise a BLE, NFC, RF, and/or a "personal" network comprising short-range wireless communications between the company devices 106a-n and the user devices 104a-n, for example.

In some embodiments, the controller device 110 (and/or the consumer devices 102a-n, user devices 104a-n, and/or company devices 106a-n) may be in communication with the database 140. The database 140 may store, for example, user and/or account identification data, security data (e.g., login credentialing and/or decryption data), blockchain data (chaincode and/or blockchain ledger data), preference and/or characteristics data, consumer profile data, permissions data, external application data (e.g., external application instructions, addresses, and/or payment information), and/or instructions that cause various devices (e.g., the controller device 110, consumer devices 102a-n, user devices 104a-n, and/or company devices 106a-n) to operate in accordance with embodiments described herein. The database 140 may store, for example, blockchain curator/notary data, chaincode, ledger data (e.g., storing various data related to user communications, relationships, and/or transactions), third-party application scripts, insured object data (e.g., type, capability, and/or location), and/or decision-making data (e.g., thresholds and/or logic). In some embodiments, the database 140 may comprise any type, configuration, and/or quantity of data storage devices that are or become known or practicable. The database 140 may, for example, comprise an array of optical and/or solid-state hard drives configured to store consumer profile data provided by (and/or requested by) the consumer devices 102a-n, user devices 104a-n, and/or company devices 106a-n, sensor analysis data (e.g., analysis formulas and/or mathematical models descriptive of sensor data parsing, object recognition, object classification, and/or numeric conversion data), blockchain access data, and/or various operating instructions, drivers, etc. While the database 140 is depicted as a stand-alone component of the system 100 in FIG. 1, the database 140 may comprise multiple components. In some embodiments, a multi-component database 140 may be distributed across various devices and/or may comprise remotely dispersed components. Any or all of the consumer devices 102a-n, user devices 104a-n, and/or company devices 106a-n may comprise the database 140 or a portion thereof, for example, and/or the controller device 110 may comprise the database or a portion thereof.

Figure 2:
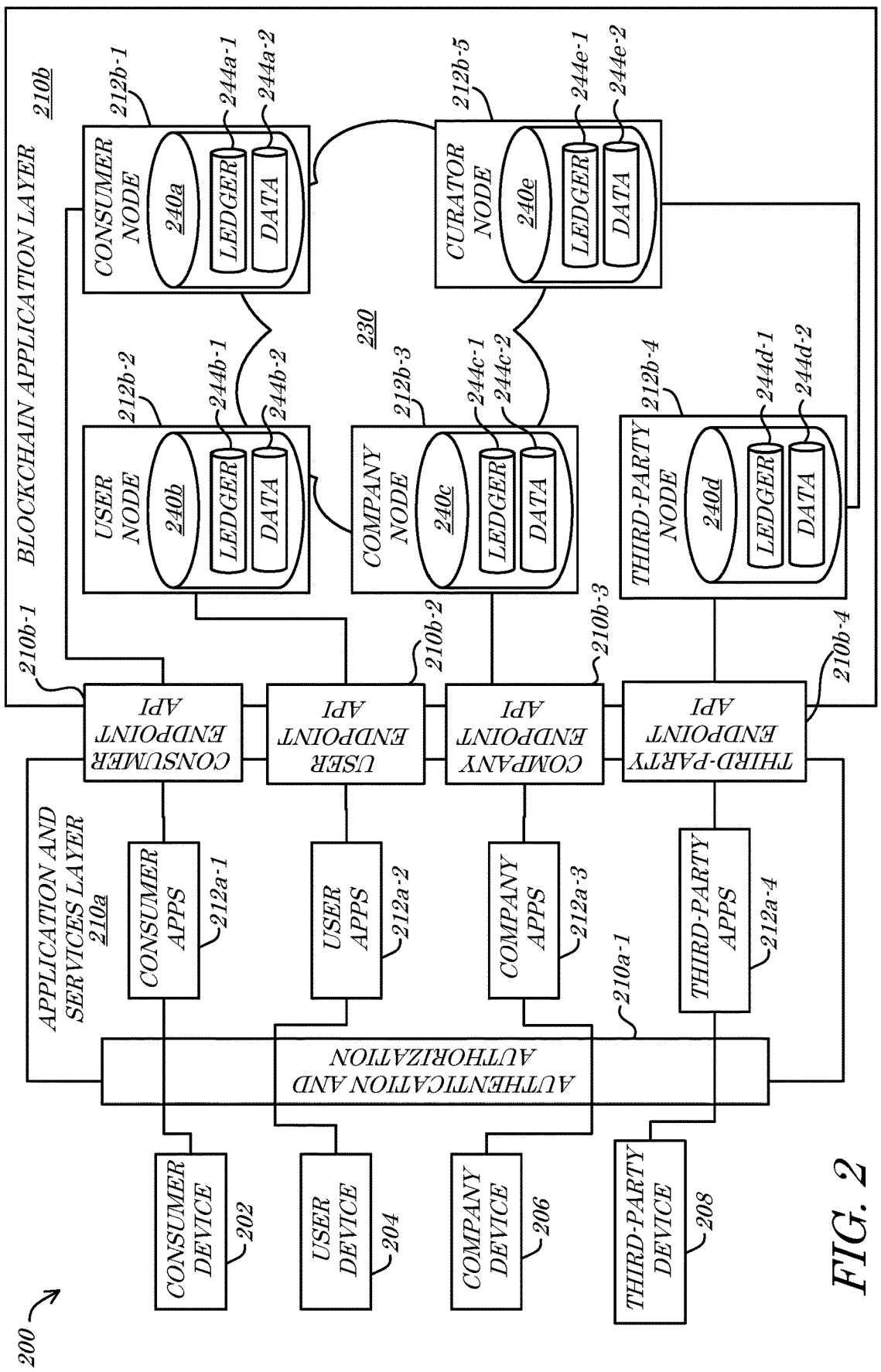
FIG. 2 is a block diagram of a system according to some embodiments.

Turning to FIG. 2, a block diagram of a system 200 according to some embodiments, is shown. In some embodiments, the system 200 may comprise a consumer device 202, a user device 204, a company device 206, and/or a third-party device 208. For ease of reference these devices may be collectively referred to as "client devices" 202, 204, 206, 208. According to some embodiments, the client devices 202, 204, 206, 208 may be in communication with various remote devices and/or systems, such as an application and services layer 210a and/or a blockchain application layer 210b. In some embodiments, the client devices 202, 204, 206, 208 may be communicatively coupled to communicate with the application and services layer 210a through an authentication and authorization gateway 210a-1. According to some embodiments, communications with the blockchain application layer 210b may be conducted through one or more client endpoints, such as a consumer endpoint API 210b-1, a user endpoint API 210b-2, a company endpoint API 210b-3, and/or a third-party endpoint API 210b-4. In some embodiments, the application and services layer 210a may authenticate access by the client devices 202, 204, 206, 208 via the authentication and authorization gateway 210a-1 and may route and/or provide access to various services available to the client devices 202, 204, 206, 208. As depicted in FIG. 2, for example, each of the client devices 202, 204, 206, 208 may be routed to and/or may access a respective application (or set of applications), such as consumer applications 212a-1, user applications 212a-2, company applications 212a-3, and/or third-party applications 212a-4.

According to some embodiments, the various applications 212a-1, 212a-2, 212a-3, 212a-4 may govern permissible activities for each of the client devices 202, 204, 206, 208 within the application and services layer 210a and/or with respect to access to the blockchain application layer 210b. The applications 212a-1, 212a-2, 212a-3, 212a-4 may, for example, manage access to particular and/or respective nodes (e.g., trusted nodes) within the blockchain application layer 210b, such as a consumer node 212b-1, a user node 212b-2, a company node 212b-3, and/or a third-party node 212b-4. In some embodiments, the blockchain application layer 210b may comprise a "notary" or "curator" node 212b-5 that manages a distributed ledger through the blockchain application layer 210b (that may, for example, manage but not have access to the blockchain/ledger). According to some embodiments, the nodes 212b-1, 212b-2, 212b-3, 212b-4 may be in communication within the blockchain application layer 210b in accordance with a management plan that defines the blockchain. As depicted in FIG. 2, for example, the consumer node 212b-1, the user node 212b-2, and the company node 212b-3 may be in communication via a network 230 with each other and/or with the curator node 212b-5. According to some embodiments, the third-party node 212b-4 may also or alternatively be in communication with the curator node 212b-5, directly (as depicted) and/or via the network 230.

In some embodiments, each of the nodes 212b-1, 212b-2, 212b-3, 212b-4 may comprise or have access to a data store 240a-e that stores a distributed copy of a ledger 244a-1, 244b-1, 244c-1, 244d-1, 244e-1 and/or other relevant data 244a-2, 244b-2, 244c-2, 244d-2, 244e-2. The blockchain application layer 210b and/or the curator node 212b-5 thereof may, for example, manage blockchain implementation by providing signature and blockchain transaction verification services to the other nodes 212b-1, 212b-2, 212b-3, 212b-4. According to some embodiments, the curator node 212b-5 may store blockchain signature and transaction verification policies, rules, and/or instructions stored in fifth data 244e-2 of a fifth data store 240e thereof. In some embodiments, the client devices 202, 204, 206, 208 may access the blockchain application layer 210b (e.g., via the application and services layer 210a) to provide, edit, and/or retrieve data stored in their respective nodes 212b-1, 212b-2, 212b-3, 212b-4 and/or to execute transactions that are recorded in the various ledgers 244a-1, 244b-1, 244c-1, 244d-1, 244e-1 in accordance with blockchain instructions. In such a manner, for example, the client devices 202, 204, 206, 208 may take advantage of asynchronous access to the blockchain application layer 210b as controlled by the respective endpoint APIs 210b-1, 210b-2, 210b-3, 210b-4 of the application and services layer 210a.

According to some embodiments, any or all of the client devices 202, 204, 206, 208 may comprise one or more smart mobile phones, such as the iPhone® 8 or a later generation iPhone®, running iOS 10 or a later generation of iOS, supporting Location Services. The iPhone® and iOS are produced by Apple Inc., however, embodiments herein are not limited to any particular portable computing device or smart mobile phone. For example, any or all of the client devices 202, 204, 206, 208 may take the form of a laptop computer, a handheld computer, a palm-size computer, a pocket computer, a palmtop computer, a Personal Digital Assistant (PDA), a tablet computer, an electronic organizer, a mobile phone, a portable/mobile phone, a feature phone, a smartphone, a tablet, a portable/mobile data terminal, an iPhone®, an iPad®, an iPod®, an Apple® Watch (or other "smart" watch), and other portable form-factor devices by any vendor containing at least one Central Processing Unit (CPU) and a wireless communication device (not separately depicted in FIG. 2).

According to some embodiments, the client devices 202, 204, 206, 208 may run (i.e., execute) mobile device software applications (not shown in FIG. 2) that cause the generation and/or output of respective Graphical User Interfaces (GUIs; also not shown in FIG. 2) that are, for example, defined by the respective applications 212a-1, 212a-2, 212a-3, 212a-4 at the application and services layer 210a. In some embodiments, the application and services layer 210a and/or the blockchain application layer 210b may be hosted by one or more servers (not separately depicted din FIG. 2) that are remote from (but communicatively coupled to) any or all of the client devices 202, 204, 206, 208. According to some embodiments, the application and services layer 210a may be hosted by a first entity (e.g., that manages or governs access to the blockchain application layer 210b and/or enables external applications to be utilized on the blockchain application layer 210b) on a first device, and the blockchain application layer 210b may be hosted by a second entity (e.g., that provides blockchain hosting services) on a second device.

As a non-limiting example of how the system 200 may be utilized in accordance with some embodiments, a consumer may utilize the consumer device 202 to develop and/or store a consumer profile (e.g., including Personally Identifiable Information (PII), payment information, private information, such as Social Security Numbers, legal information, health information, and/or preference information) in first data 244a-2 stored in a first data store 240a of the consumer node 212b-1. The various ledgers 244a-1, 244b-1, 244c-1, 244d-1, 244e-1 may be updated and/or defined to reflect any activity of the consumer, including establishing permissions for access to the consumer's profile. The consumer may, for example, grant permission to a particular user, such as an insurance agent or broker, that utilizes the user device 204. In some embodiments, the agent may utilize the user device 204 to access the consumer profile (or portions thereof), as governed by the user applications 212a-2 and the user endpoint API 210b-2. According to some embodiments, the agent may subscribe to a third-party analysis service, which may be provided by a third-party operating the third-party device 208, and may utilize the application and services layer 210a to (i) subscribe to the third-party service and/or (ii) execute the third-party service on (or against or utilizing) the blockchain (e.g., at least one of the copies of the ledger 244a-1, 244b-1, 244c-1, 244d-1, 244e-1). The blockchain application layer 210b may, in some embodiments and at the direction or initiation of the application and services layer 210a, permit limited access of the third-party device 208 to the blockchain application layer 210b. According to some embodiments, the third-party applications 212a-4 may return information (data, values, etc.) to the user device 204 (e.g., in accordance with the agent's subscription with the third-party). In some embodiments, the agent may utilize the third-party information and the consumer profile information to submit a request, query, application, etc. to a particular company utilizing the company device 206. The company device 206 may access the system 200 and may selectively activate and/or execute one or more additional third-party services via the application and services layer 210*a*. Any response, result, or answer of the company may then, for example, be provided back to the consumer via the consumer device 202. Any or all such transactions may be recorded in the blockchain (e.g., the various ledgers 244*a*-1, 244*b*-1, 244*c*-1, 244*d*-1, 244*e*-1) and may, according to the architecture of the system 200, be accomplished asynchronously (e.g., once the consumer profile is created).

Fewer or more components 202, 204, 206, 208, 210*a-b*, 210*a*-1, 210*b*-1, 210*b*-2, 210*b*-3, 210*b*-4, 212*a*-1, 212*a*-2, 212*a*-3, 212*a*-4, 212*b*-1, 212*b*-2, 212*b*-3, 212*b*-4, 212*b*-5, 230, 240*a-e*, 244*a*-1, 244*b*-1, 244*c*-1, 244*d*-1, 244*e*-1, 244*a*-2, 244*b*-2, 244*c*-2, 244*d*-2, 244*e*-2 and/or various configurations of the depicted components 202, 204, 206, 208, 210*a-b*, 210*a*-1, 210*b*-1, 210*b*-2, 210*b*-3, 210*b*-4, 212*a*-1, 212*a*-2, 212*a*-3, 212*a*-4, 212*b*-1, 212*b*-2, 212*b*-3, 212*b*-4, 212*b*-5, 230, 240*a-e*, 244*a*-1, 244*b*-1, 244*c*-1, 244*d*-1, 244*e*-1, 244*a*-2, 244*b*-2, 244*c*-2, 244*d*-2, 244*e*-2 may be included in the system 200 without deviating from the scope of embodiments described herein. In some embodiments, the components 202, 204, 206, 208, 210*a-b*, 210*a*-1, 210*b*-1, 210*b*-2, 210*b*-3, 210*b*-4, 212*a*-1, 212*a*-2, 212*a*-3, 212*a*-4, 212*b*-1, 212*b*-2, 212*b*-3, 212*b*-4, 212*b*-5, 230, 240*a-e*, 244*a*-1, 244*b*-1, 244*c*-1, 244*d*-1, 244*e*-1, 244*a*-2, 244*b*-2, 244*c*-2, 244*d*-2, 244*e*-2 may be similar in configuration and/or functionality to similarly named and/or numbered components as described herein. In some embodiments, the system 200 (and/or portions thereof) may comprise an asynchronous API-driven external application services for blockchain program, system, and/or platform programmed and/or otherwise configured to execute, conduct, and/or facilitate the methods 400, 500, 600, 800, 900 of FIG. 4, FIG. 5, FIG. 6, FIG. 8, and/or FIG. 9 herein, and/or portions or combinations thereof.

Figure 3:
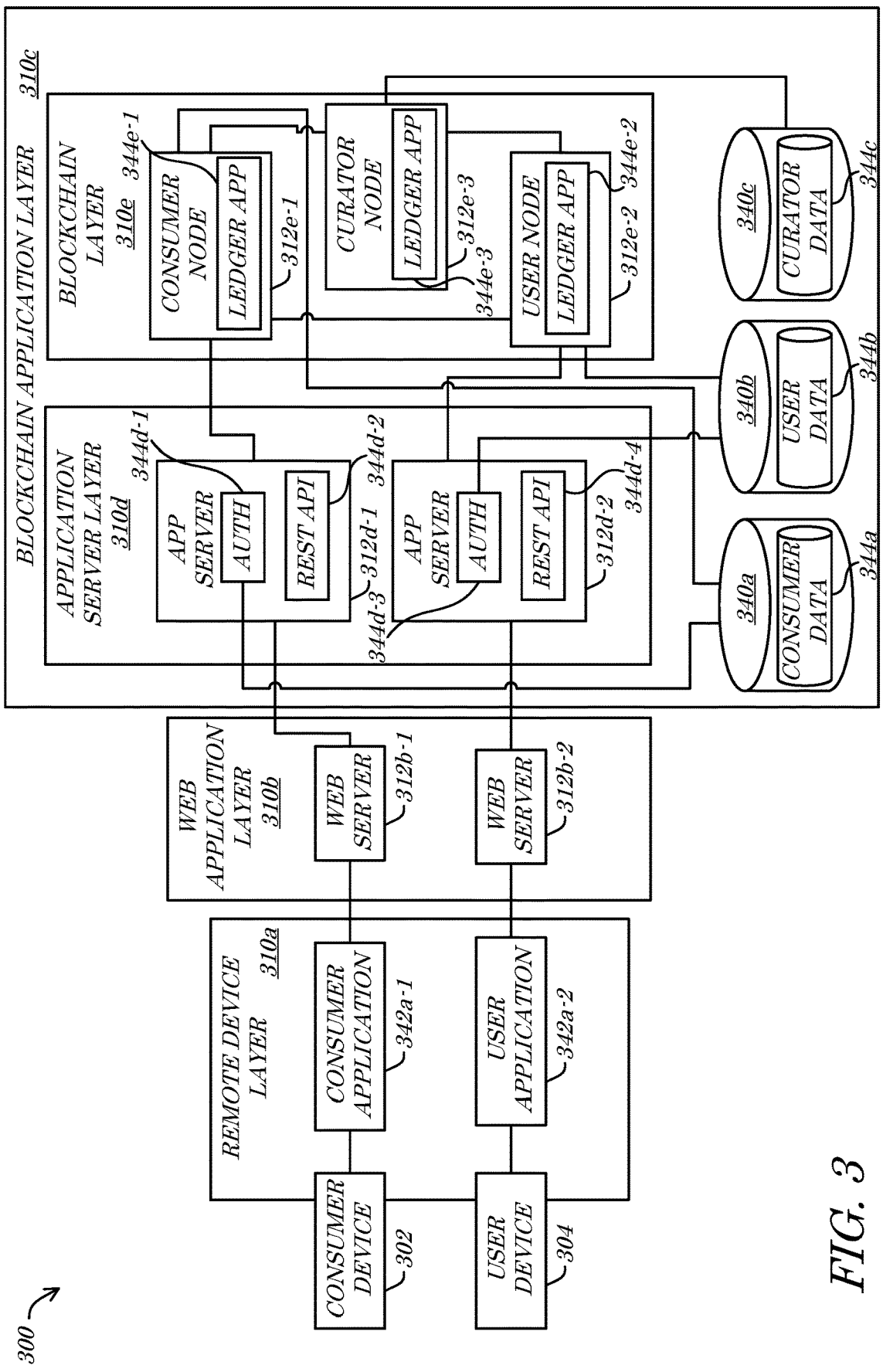
FIG. 3 is a block diagram of a system according to some embodiments.

Turning now to FIG. 3, a block diagram of system 300 according to some embodiments is shown. In some embodiments, the system 300 may comprise a system that enables asynchronous customer profile sharing in conjunction with implementation of blockchain distributed ledger functionality. The system 300 may comprise, for example, a consumer device 302 and/or a user device 304, each in communication with one or more of a remote device layer 310*a*, a web application layer 310*b*, and/or a blockchain application layer 310*c* (e.g., that may comprise an application server layer 310*d* and/or a blockchain layer 310*e*). According to some embodiments, the consumer device 302 and/or the user device 304 may communicate with one or more remote processing devices, such as respective web servers 312*b*-1, 312*b*-2, application servers 312*d*-1, 312*d*-2, and/or blockchain nodes, such as a consumer node 312*e*-1 and/or a user node 312*e*-2. In some embodiments, the respective nodes 312*e*-1, 312*e*-2 may be in communication with (e.g., via the blockchain layer 310*e*) a curator node 312*e*-3 that may, for example, manage and/or coordinate the signature, authentication, and/or functionality of the blockchain layer 310*e*. According to some embodiments, the system 300 may comprise and/or the consumer device 302 and/or the user device 304 may be in communication with (directly or indirectly) one or more databases 340*a-c*.

In some embodiments, the consumer device 302 and/or the user device 304 may be in communication with and/or define the remote device layer 310*a* via which respective applications, such as a consumer application 342*a*-1 and/or a user application 342*a*-2, may be operable to accept input from and/or cause output via one or more of the respective consumer device 302 and/or the user device 304. The applications 342*a*-1, 342*a*-2 may communicate with the respective web servers 312*b*-1, 312*b*-2, for example, to provide for authentication and/or transaction implementation of the consumer device 302 and/or the user device 304. Data 344*a-c* stored in the databases 340*a-c* may be utilized, for example, to authenticate credentials, verify object states, identify operational thresholds and/or logic, execute requested transactions, etc. According to some embodiments, consumer data 344*a* may be accessed to authenticate credentials provided by the consumer device 302, for example, and/or user data 344*b* may be accessed to authenticate credentials provided by the user device 304. According to some embodiments, curator data 344*c* may be accessed to operate the blockchain layer 310*e* by applying blockchain logic and/or rules to selectively validate blockchain transactions that meet the specified thresholds/criteria.

According to some embodiments, functional operation of the system 300 may comprise the consumer device 302 accepting and/or identifying consumer credentials (not shown) as input into the consumer application 342*a*-1 of the remote device layer 310*a*. In some embodiments, the consumer application 342*a*-1 may initiate communications with a first web server 312*b*-1 of the web application layer 310*b* and pass the consumer credentials (or one or more indications thereof) to the first web server 312*b*-1 as a first login request. According to some embodiments, the first web server 312*b*-1 may generate a login request, such as a Hyper-Text Transfer Protocol (HTTP) POST request, and send the request to a first application server 312*d*-1. In some embodiments, the request may be sent to and/or received by a first authorization module or API 344*d*-1 of the first application server 312*d*-1 (in the application server layer 310*d*). The first authorization API 344*d*-1 may, in response to receiving the request, for example, query a first or consumer database 340*a* and/or the consumer data 344*a* thereof to authenticate the consumer credentials. In some embodiments, upon a successful return and/or match of the consumer data 344*a*, the first authorization API 344*d*-1 (and/or the first application server 312*d*-1) may return an authentication success response (and/or additional lookup data) that may comprise or define a cryptographic string, such as a bearer token (e.g., a JavaScript Object Notation (JSON) Web Token (JWT)). In the case of a failed authentication (e.g., invalid consumer credentials) a failure response may be returned. In either case, the response may be returned by the first authorization API 344*d*-1 (and/or the first application server 312*d*-1) to the first web server 312*b*-1 (e.g., the web application layer 310*b*) and on to the consumer application 342*a*-1 (e.g., the remote device layer 310*a*). In the case that the response indicates a success, the consumer may be successfully logged into the consumer application 342*a*-1. In the case of a failure response, the consumer may be notified of the failure and/or given the opportunity to try again.

In some embodiments, once the consumer is logged into the system 300 (and/or the consumer application 342*a*-1 thereof) the consumer may initiate a transaction by providing and/or defining transaction input via the consumer device 302. In the non-limiting example case of consumer profile creation and sharing to allow asynchronous communications, the consumer device 302 may receive and/or identify input defining a profile for the consumer (or a portion thereof, such as PII, preferences, etc.). According to some embodiments, the consumer application 342a-1 may (in response to the receiving of the profile input) generate a "create" request that is passed to the first web server 312b-1. In some embodiments, the first web server 312b-1 may generate a corresponding create request, such as an HTTP POST request, that is forwarded to a first REST API 344d-2 of the first application server 312d-1. The first REST API 344d-2 may, in response to receiving the transaction (e.g., "create") request, for example, call the consumer node 312e-1 (e.g., via a Remote Procedure Call (RPC)) of the blockchain layer 310e. According to some embodiments, the transaction request may be received by a first ledger application 344e-1 stored and/or executed on the consumer node 312e-1. The first ledger application 344e-1 may, for example, execute chaincode (not separately shown in FIG. 3) and/or manage distributed ledger verifications and communications with either or both of the user node 312e-2 (e.g., having a second ledger application 344e-2) and the curator node 312e-3 (e.g., having a third ledger application 344e-3). Information indicative of the "create" transaction may be stored, once signed and/or verified by the first ledger application 344e-1 and/or by the curator node 312e-3 (and/or the third ledger application 344e-3 thereof), for example, in any or all of the nodes 312e-1, 312e-2, 312e-3 and/or in any or all of the databases 340a-c, such as in the consumer data 344a of the first database 340a.

According to some embodiments, the blockchain layer 310e (e.g., the consumer node 312e-1 and/or the curator node 312e-3) may return an indication of successful blockchain transaction verification and/or entry, by returning a transaction hash to the first application server 312d-1 and/or to the first REST API 344d-2 thereof. The first application server 312d-1 and/or the first REST API 344d-2 may then, for example, forward the transaction hash to the first web server 312b-1, which may forward or pass the transaction hash to the consumer application 342a-1. In such a manner, for example, the consumer may securely define and/or store data stored in the blockchain application layer 310c. In some embodiments, and continuing the non-limiting example of a consumer profile described herein, such information may include personal information (e.g., PII), location information, health information, asset information (e.g., vehicle, structure, and/or other object identification and/or characteristic data), financial information (e.g., gross revenue from a business), historical information, etc. According to some embodiments, the information may include permission and/or sharing information, such as an indication of a user (e.g., a user name, identifier number, address, e-mail, etc.) and an indication of a level of data access or permissions granted by the consumer to the specific user. In such a manner, for example, the consumer may not only develop a remotely stored data profile, but may readily share or grant access to the profile (or portions thereof) to one or more other users of the system 300.

In some embodiments, functional operation of the system 300 may comprise the user device 304 accepting and/or identifying user credentials (not shown) as input into the user application 342a-2 of the remote device layer 310a. In some embodiments, the user application 342a-2 may initiate communications with a second web server 312b-2 of the web application layer 310b and pass the user credentials (or one or more indications thereof) to the second web server 312b-2 as a second login request. According to some embodiments, the second web server 312b-2 may generate a login request, such as an HTTP POST request, and send the request to a second application server 312d-2. In some embodiments, the request may be sent to and/or received by a second authorization module or API 344d-3 of the second application server 312d-2 (in the application server layer 310d). The second authorization API 344d-3 may, in response to receiving the request, for example, query a second or user database 340b and/or the user data 344b thereof to authenticate the user credentials. In some embodiments, upon a successful return and/or match of the user data 344b, the second authorization API 344d-3 (and/or the second application server 312d-2) may return an authentication success response (and/or additional lookup data) that may comprise or define a cryptographic string, such as a bearer token (e.g., a JWT). In the case of a failed authentication (e.g., invalid user credentials) a failure response may be returned. In either case, the response may be returned by the second authorization API 344d-3 (and/or the second application server 312d-2) to the second web server 312b-2 (e.g., the web application layer 310b) and on to the user application 342a-2 (e.g., the remote device layer 310a). In the case that the response indicates a success, the user may be successfully logged into the user application 342a-2. In the case of a failure response, the user may be notified of the failure and/or given the opportunity to try again.

In some embodiments, once the user is logged into the system 300 (and/or the user application 342a-2 thereof) the user may initiate a transaction by providing and/or defining transaction input via the user device 304. In the non-limiting example case of consumer profile creation and sharing to allow asynchronous communications, the user device 304 may receive and/or identify input defining a request to access a profile for a consumer (or a portion thereof) or, for example, a request to retrieve all shared consumer profiles associated with the user. According to some embodiments, the user application 342a-2 may (in response to the receiving of the access request) generate an access request that is passed to the second web server 312b-2. In some embodiments, the second web server 312b-2 may generate a corresponding access request, such as an HTTP POST request, that is forwarded to a second REST API 344d-4 of the second application server 312d-2. The second REST API 344d-4 may, in response to receiving the transaction (e.g., access) request, for example, call the user node 312e-2 (e.g., via an RPC) of the blockchain layer 310e. According to some embodiments, the transaction request may be received by the second ledger application 344e-2 stored and/or executed on the user node 312e-2. The second ledger application 344e-2 may, for example, execute chaincode (not separately shown in FIG. 3) and/or manage distributed ledger verifications and communications with either or both of the consumer node 312e-1 (e.g., having the first ledger application 344e-1) and the curator node 312e-3 (e.g., having the third ledger application 344e-3). Information indicative of the access transaction may be stored, once signed and/or verified by the second ledger application 344e-2 and/or by the curator node 312e-3 (and/or the third ledger application 344e-3 thereof), for example, in any or all of the nodes 312e-1, 312e-2, 312e-3 and/or in any or all of the databases 340a-c, such as in the user data 344b of the second database 340b.

According to some embodiments, the blockchain layer 310e (e.g., the user node 312e-2 and/or the curator node 312e-3) may return an indication of successful blockchain transaction verification and/or entry and/or an indication of identified shared consumer profiles, by returning a transaction hash and/or a listing of consumer profile states to the second application server 312d-2 and/or to the second REST API 344d-4 thereof. The second application server 312d-2 and/or the second REST API 344d-4 may then, for example, forward the transaction hash and/or the listing of states to the second web server 312b-2, which may forward or pass the transaction hash and/or the listing of states to the user application 342a-2. According to some embodiments, the user application 342a-2 may utilize the data returned from the blockchain application layer 310c to output information indicative of the shared consumer profiles via the user device 304. In such a manner, for example, the user may securely access selectively shared data stored in the blockchain application layer 310c. In some embodiments, and continuing the non-limiting example of a consumer profile described herein, the user device 304 may be owned and/or operated by an agent, representative, employee, and/or other party, thereby enabling the consumer (e.g. utilizing the consumer device 302) to readily and securely share access to their profile information (or portions thereof) with any number of desired agents, vendors, companies, etc. In some embodiments, the user device 304 may be utilized to provide additional sharing and/or profile distribution, such as in the case that an agent shares the consumer profile with a plurality of companies. According to some embodiments, the ability to sub-share may comprise a specific permission granted (or denied) by the consumer with respect to their profile data.

Fewer or more components 302, 304, 310a-e, 312b-1, 312b-2, 312d-1, 312d-2, 312e-1, 312e-2, 312e-3, 340a-c, 342a-1, 342a-2, 344a-c, 344d-1, 344d-2, 344d-3, 344d-4, 344e-1, 344e-2, 344e-3 and/or various configurations of the depicted components 302, 304, 310a-e, 312b-1, 312b-2, 312d-1, 312d-2, 312e-1, 312e-2, 312e-3, 340a-c, 342a-1, 342a-2, 344a-c, 344d-1, 344d-2, 344d-3, 344d-4, 344e-1, 344e-2, 344e-3 may be included in the system 300 without deviating from the scope of embodiments described herein. In some embodiments, the components 302, 304, 310a-e, 312b-1, 312b-2, 312d-1, 312d-2, 312e-1, 312e-2, 312e-3, 340a-c, 342a-1, 342a-2, 344a-c, 344d-1, 344d-2, 344d-3, 344d-4, 344e-1, 344e-2, 344e-3 may be similar in configuration and/or functionality to similarly named and/or numbered components as described herein. In some embodiments, the system 300 (and/or portions thereof) may comprise an asynchronous API-driven external application services for blockchain program, system, and/or platform programmed and/or otherwise configured to execute, conduct, and/or facilitate the methods 400, 500, 600, 800, 900 of FIG. 4, FIG. 5, FIG. 6, FIG. 8, and/or FIG. 9 herein, and/or portions or combinations thereof.

III. Asynchronous API-Driven Application Services for Blockchain Methods

Figure 4:
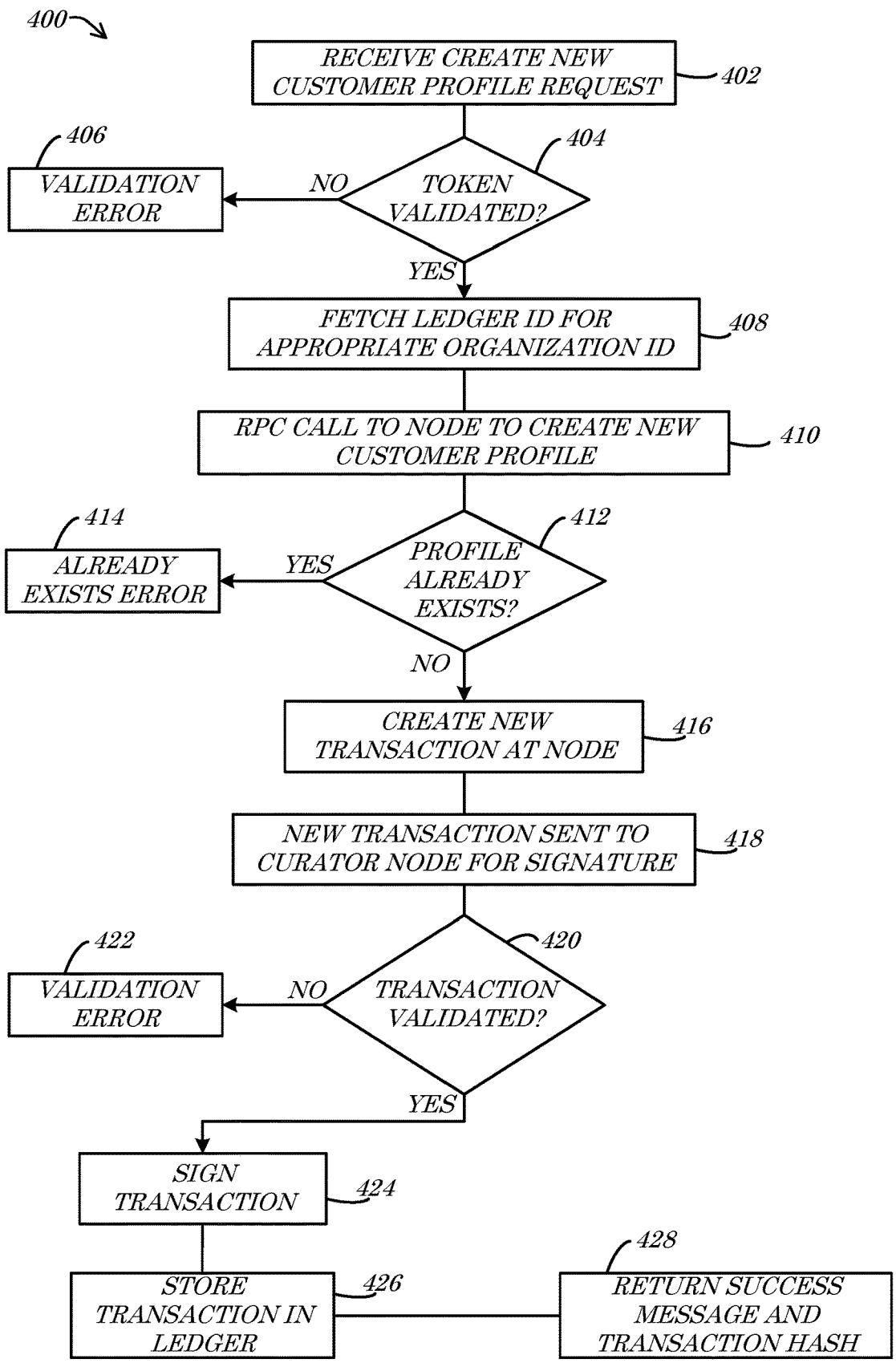
FIG. 4 is a flow diagram of a method according to some embodiments.

Referring now to FIG. 4, a flow diagram of a method 400 according to some embodiments is shown. In some embodiments, the method 400 may be performed and/or implemented by and/or otherwise associated with one or more specialized and/or specially-programmed computers (e.g., one or more of the consumer devices 102a-n, 202, 302, user devices 104a-n, 204, 304, 904, company devices 106a-n, 206, third-party devices 208, 708, 908, the controller devices and/or layers 110, 210a-b, 310a-e, 710a-e, 910d-e, and/or the apparatus 1010 of FIG. 1, FIG. 2, FIG. 3, FIG. 7, FIG. 9, and/or FIG. 10 herein), computer terminals, computer servers, computer systems and/or networks, and/or any combinations thereof (e.g., by one or more multi-threaded and/or multi-core processing units of an asynchronous API-driven external application services for blockchain processing system). In some embodiments, the method 400 may be embodied in, facilitated by, and/or otherwise associated with various input mechanisms and/or interfaces (such as the interface 1020 of FIG. 10 herein). According to some embodiments, the method 400 may embody a "create" flow that comprises a non-limiting example of how a consumer may create a consumer profile record (e.g., for sharing with other users, companies, third-parties, etc.).

The process diagrams and flow diagrams described herein do not necessarily imply a fixed order to any depicted actions, steps, and/or procedures, and embodiments may generally be performed in any order that is practicable unless otherwise and specifically noted. While the order of actions, steps, and/or procedures described herein is generally not fixed, in some embodiments, actions, steps, and/or procedures may be specifically performed in the order listed, depicted, and/or described and/or may be performed in response to any previously listed, depicted, and/or described action, step, and/or procedure. Any of the processes and methods described herein may be performed and/or facilitated by hardware, software (including microcode), firmware, or any combination thereof. For example, a storage medium (e.g., a hard disk, Random Access Memory (RAM) device, cache memory device, Universal Serial Bus (USB) mass storage device, and/or Digital Video Disk (DVD); e.g., the memory/data storage devices 140, 240a-e, 340a-c, 740a-c, 940, 1040, 1140a-e of FIG. 1, FIG. 2, FIG. 3, FIG. 7, FIG. 9, FIG. 10, FIG. 11A, FIG. 11B, FIG. 11C, FIG. 11D, and/or FIG. 11E herein) may store thereon instructions that when executed by a machine (such as a computerized processor) result in performance according to any one or more of the embodiments described herein.

In some embodiments, the method 400 may comprise receiving (e.g., by an electronic processing device of an application server and/or from a mobile application of a mobile electronic device of a consumer) a request to create a new consumer or customer profile, at 402. A consumer (e.g., a customer or potential customer) may utilize the mobile electronic device, for example, to input a login/user name or ID (e.g., an account identifier, consumer identifier, organization identifier, etc.), password, passphrase, biometric identifier, etc. In some embodiments, the input credentials may comprise and/or define a token that is passed to a User Interface (UI) application node service in communication with the mobile application being executed on the mobile electronic device. In some embodiments, the UI application service may forward the login request to a login API of an application server by generating an HTTP POST request that comprises the login credentials as JSON input. According to some embodiments, the token/credentials may be encrypted and/or compressed and/or may comprise decryption and/or decompression keys, data, hashes, etc. In some embodiments, the request may comprise data descriptive of the consumer/customer, such as PII, object ownership data, object characteristic data (e.g., year built, model year, miles driven, construction type, location, etc.), consumer preference data, and/or data permissions and/or security information (e.g., a listing of identifiers indicative of one or more other parties that are granted permission to access and/or edit the consumer's data).

According to some embodiments, the method 400 may comprise determining (e.g., by the electronic processing device of the application server) whether the token is validated, at 404. In response to the receiving of the request to create the new consumer profile, for example, the electronic processing device may query a database (e.g., a security database) or other data store to identify and/or compare data stored in relation to the consumer's account, identifier, address, etc. The consumer's input may be compared, for example, to pre-stored and/or specially generated data (e.g., metadata and/or a specially generated passcode)

to identify a match. In the case that the input does not match, a challenge may be transmitted, communications with the consumer may be terminated, and/or a login failure or error message may be provided to the consumer, at 406. In the case that the input matches the pre-stored/generated data, the identity and/or authorization of the consumer may be inferred and the method 400 may continue to, e.g., provide a successful login token back to the UI application node service.

In some embodiments, the method 400 may comprise fetching (e.g., by the electronic processing device of the application server) a ledger ID for an appropriate organization ID, at 408. One or more identifiers and/or other data stored in relation to the login credentials and/or request may be identified and/or retrieved, for example, by directing a relational query to a consumer database, e.g., stored by a non-transitory computer-readable memory device in communication with the electronic processing device. In some embodiments, the method 400 may comprise generating (e.g., by the electronic processing device of the application server) an RPC call to a blockchain node to create the new consumer profile, at 410. The organization ID and/or the token may be embedded in and/or provided with the RPC call, for example, to provide credentialing validation and node selection data for access to the blockchain. The organization ID may be utilized to direct the RPC call to the appropriate (e.g., assigned) node in the blockchain, for example, and the login success token may be utilized by the blockchain system to verify access permissions.

According to some embodiments, the method 400 may comprise determining (e.g., by the electronic processing device of the blockchain node) whether the consumer profile already exists, at 412. In response to the receiving of the request to create the new consumer profile, for example, the electronic processing device may query a database (e.g., a consumer profile database) or other data store to identify and/or compare data stored in relation to the consumer's account, identifier, address, etc. The consumer's input may be compared, for example, to pre-stored data to identify a match. In the case that the input matches already stored/existing data, a failure or error message may be provided to the consumer that indicates that the consumer profile (or requested portions thereof) already exists, at 414. In the case that the input does not match the pre-stored data, it may be inferred that the input is new and the method 400 may continue to, e.g., provide an indication of a successful duplicate data check back to the UI application node service.

In some embodiments, the method 400 may comprise creating (e.g., by the electronic processing device of the blockchain node) a new transaction at the blockchain node, at 416. The blockchain node associated with and/or assigned to the consumer may (e.g., based on the organization ID; e.g., for multi-tenancy nodes), for example, execute a local copy of chaincode instructions to perform blockchain data storage and/or verification tasks in accordance with stored ledger/blockchain rules, thresholds, and/or logic. According to some embodiments, the creating of the new transaction may comprise storing a copy of any or all data descriptive of the transaction at the consumer's blockchain node (e.g., a first local copy of the transaction data). In some embodiments, data descriptive of the transaction may be communicated to one or more other nodes for verification, validation, signature, storage, etc.

According to some embodiments, the method 400 may comprise sending (e.g., by the electronic processing device of the consumer's blockchain node) the new transaction to a curator node for signature, at 418. The curator node may, for example, comprise a blockchain management node that interrogates a plurality of trusted nodes to verify new transactions. In some embodiments, the curator node may receive the new transaction data (or indications thereof) from the consumer's blockchain node and may execute a local copy of chaincode instructions and/or blockchain management instructions to perform various tasks triggered by the data received from the consumer's blockchain node.

In some embodiments, the method 400 may comprise determining (e.g., by an electronic processing device of the curator node) whether the transaction is validated, at 420. In response to the receiving of the request to sign the new transaction, for example, the electronic processing device of the curator node may query one or more nodes other than the consumer's node to verify the permissions and/or logic-based appropriateness of the new transaction as compared to distributed copies of the blockchain stored with respect to the consumer (e.g., keyed on the organization ID). Each queried node may, in some embodiments, compare the new transaction data to pre-stored rules and/or stored blockchain copies to identify a contextual appropriateness of the new transaction. The new transaction data may be compared to one or more object states defined by previous chaincode transactions stored in the respective distributed copies of the ledger/blockchain, for example, to verify that the new transaction is compatible with the identified states. In the case that the new transaction does not correspond to the identified states and/or stored data, a validation failure or error message may be provided back to the curator node and/or forwarded back to the consumer, at 422. In the case that the new transaction is determined to be compatible with the stored data, the appropriateness of the new transaction may be inferred and the method 400 may continue by, e.g., having the curator node sign the transaction, at 424. In some embodiments, upon signature/validation by the curator node (e.g., due to positive results being returned from each queried trusted node; at 424) a copy of the new transaction and/or a blockchain entry descriptive of the new transaction may be copied to any or all trusted nodes (e.g., a plurality of additional local copies of the transaction data) to update the distributed ledger, at 426. The new transaction may be recorded in accordance with the blockchain instructions executed by the curator node, for example, by distributing and storing a copy of a data block descriptive of the new transaction to each of the curator node, the consumer node, and/or any or all other trusted nodes in the blockchain system. According to some embodiments, the method 400 may comprise returning an indication of a successful new transaction and/or a transaction hash back to the UI application node service (e.g., to the consumer's device). In such a manner, for example, the consumer may readily and securely provide new data to create a new customer profile that may be utilized to facilitate asynchronous communications with respect to the profile, as described herein.

Figure 5:
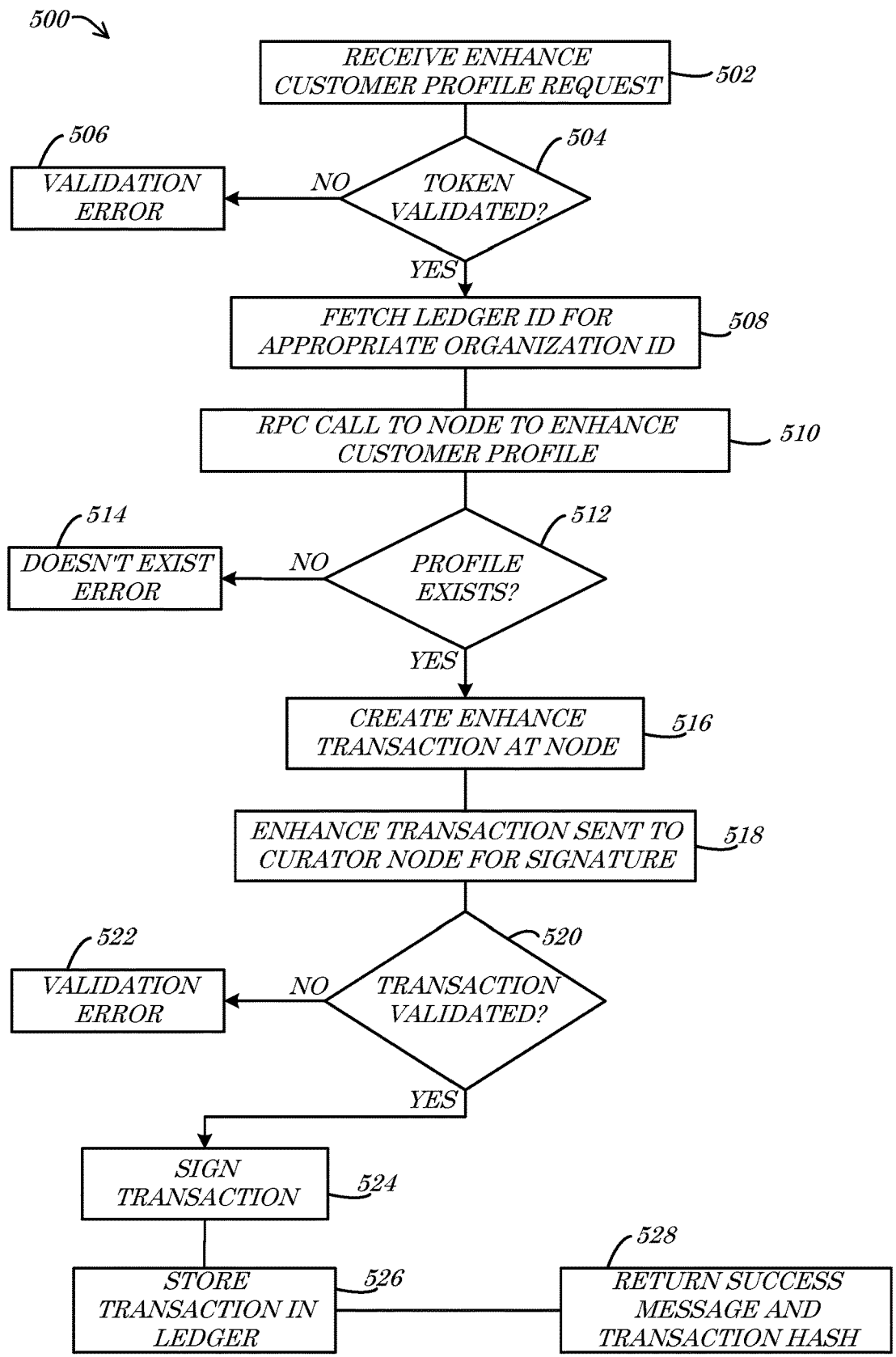
FIG. 5 is a flow diagram of a method according to some embodiments.

Turning now to FIG. 5, a flow diagram of a method 500 according to some embodiments is shown. In some embodiments, the method 500 may be performed and/or implemented by and/or otherwise associated with one or more specialized and/or specially-programmed computers (e.g., one or more of the consumer devices 102a-n, 202, 302, user devices 104a-n, 204, 304, 904, company devices 106a-n, 206, third-party devices 208, 708, 908, the controller devices and/or layers 110, 210a-b, 310a-e, 710a-e, 910d-e, and/or the apparatus 1010 of FIG. 1, FIG. 2, FIG. 3, FIG. 7, FIG. 9, and/or FIG. 10 herein), computer terminals, computer servers, computer systems and/or networks, and/or any combinations thereof (e.g., by one or more multi-threaded and/or multi-core processing units of an asynchronous API-driven external application services for blockchain processing system). In some embodiments, the method 500 may be embodied in, facilitated by, and/or otherwise associated with various input mechanisms and/or interfaces (such as the interface 1020 of FIG. 10 herein). According to some embodiments, the method 500 may embody an "enhance" flow that comprises a non-limiting example of how a consumer may update a consumer profile record (e.g., for sharing with other users, companies, third-parties, etc.).

In some embodiments, the method 500 may comprise receiving (e.g., by an electronic processing device of an application server and/or from a mobile application of a mobile electronic device of a consumer) a request to enhance a consumer or customer profile, at 502. A consumer (e.g., a customer or potential customer) may utilize the mobile electronic device, for example, to input a login/user name or ID (e.g., an account identifier, consumer identifier, organization identifier, etc.), password, passphrase, biometric identifier, etc. In some embodiments, the input credentials may comprise and/or define a token that is passed to a UI application node service in communication with the mobile application being executed on the mobile electronic device. In some embodiments, the UI application service may forward the login request to a login API of an application server by generating an HTTP POST request that comprises the login credentials as JSON input. According to some embodiments, the token/credentials may be encrypted and/or compressed and/or may comprise decryption and/or decompression keys, data, hashes, etc. In some embodiments, the request may comprise data descriptive of the consumer/customer, such as PII, object ownership data, object characteristic data (e.g., year built, model year, miles driven, construction type, location, etc.), consumer preference data, and/or data permissions and/or security information (e.g., a listing of identifiers indicative of one or more other parties that are granted permission to access and/or edit the consumer's data).

According to some embodiments, the method 500 may comprise determining (e.g., by the electronic processing device of the application server) whether the token is validated, at 504. In response to the receiving of the request to enhance the consumer profile, for example, the electronic processing device may query a database (e.g., a security database) or other data store to identify and/or compare data stored in relation to the consumer's account, identifier, address, etc. The consumer's input may be compared, for example, to pre-stored and/or specially generated data (e.g., metadata and/or a specially generated passcode) to identify a match. In the case that the input does not match, a challenge may be transmitted, communications with the consumer may be terminated, and/or a login failure or error message may be provided to the consumer, at 506. In the case that the input matches the pre-stored/generated data, the identity and/or authorization of the consumer may be inferred and the method 500 may continue to, e.g., provide a successful login token back to the UI application node service.

In some embodiments, the method 500 may comprise fetching (e.g., by the electronic processing device of the application server) a ledger ID for an appropriate organization ID, at 508. One or more identifiers and/or other data stored in relation to the login credentials and/or request may be identified and/or retrieved, for example, by directing a relational query to a consumer database, e.g., stored by a non-transitory computer-readable memory device in communication with the electronic processing device. In some embodiments, the method 500 may comprise generating (e.g., by the electronic processing device of the application server) an RPC call to a blockchain node to enhance the consumer profile, at 510. The organization ID and/or the token may be embedded in and/or provided with the RPC call, for example, to provide credentialing validation and node selection data for access to the blockchain. The organization ID may be utilized to direct the RPC call to the appropriate (e.g., assigned; e.g., multi-tenancy nodes) node in the blockchain, for example, and the login success token may be utilized by the blockchain system to verify access permissions.

According to some embodiments, the method 500 may comprise determining (e.g., by the electronic processing device of the blockchain node) whether the consumer profile already exists, at 512. In response to the receiving of the request to enhance the consumer profile, for example, the electronic processing device may query a database (e.g., a consumer profile database) or other data store to identify and/or compare data stored in relation to the consumer's account, identifier, address, etc. The consumer's input may be compared, for example, to pre-stored data to identify a match. In the case that the input does not match already stored/existing data, a failure or error message may be provided to the consumer that indicates that the consumer profile (or requested enhanced portions thereof) do not exist, at 514. In the case that the input does match the pre-stored data, it may be inferred that the enhancement input is properly correlated to existing data and the method 500 may continue to, e.g., provide an indication of a successful existing data check back to the UI application node service.

In some embodiments, the method 500 may comprise creating (e.g., by the electronic processing device of the blockchain node) an enhance transaction at the blockchain node, at 516. The blockchain node associated with and/or assigned to the consumer may (e.g., based on the organization ID; e.g., for multi-tenancy nodes), for example, execute a local copy of chaincode instructions to perform blockchain data storage and/or verification tasks in accordance with stored ledger/blockchain rules, thresholds, and/or logic. According to some embodiments, the creating of the enhance transaction may comprise storing a copy of any or all data descriptive of the transaction at the consumer's blockchain node (e.g., a first local copy of the transaction data). In some embodiments, data descriptive of the transaction may be communicated to one or more other nodes for verification, validation, signature, storage, etc.

According to some embodiments, the method 500 may comprise sending (e.g., by the electronic processing device of the consumer's blockchain node) the enhance transaction to a curator node for signature, at 518. The curator node may, for example, comprise a blockchain management node that interrogates a plurality of trusted nodes to verify enhance transactions. In some embodiments, the curator node may receive the enhance transaction data (or indications thereof) from the consumer's blockchain node and may execute a local copy of chaincode instructions and/or blockchain management instructions to perform various tasks triggered by the data received from the consumer's blockchain node.

In some embodiments, the method 500 may comprise determining (e.g., by an electronic processing device of the curator node) whether the transaction is validated, at 520. In response to the receiving of the request to sign the enhance transaction, for example, the electronic processing device of the curator node may query one or more nodes other than the consumer's node to verify the permissions and/or logic-based appropriateness of the enhance transaction as compared to distributed copies of the blockchain stored with respect to the consumer (e.g., keyed on the organization ID). Each queried node may, in some embodiments, compare the enhance transaction data to pre-stored rules and/or stored blockchain copies to identify a contextual appropriateness of the enhance transaction. The enhance transaction data may be compared to one or more object states defined by previous chaincode transactions stored in the respective distributed copies of the ledger/blockchain, for example, to verify that the enhance transaction is compatible with the identified states. In the case that the enhance transaction does not correspond to the identified states and/or stored data, a validation failure or error message may be provided back to the curator node and/or forwarded back to the consumer, at 522. In the case that the enhance transaction is determined to be compatible with the stored data, the appropriateness of the enhance transaction may be inferred and the method 500 may continue by, e.g., having the curator node sign the transaction, at 524. In some embodiments, upon signature/validation by the curator node (e.g., due to positive results being returned from each queried trusted node; at 524) a copy of the enhance transaction and/or a blockchain entry descriptive of the enhance transaction may be copied to any or all trusted nodes (e.g., a plurality of additional local copies of the transaction data) to update the distributed ledger, at 526. The enhance transaction may be recorded in accordance with the blockchain instructions executed by the curator node, for example, by distributing and storing a copy of a data block descriptive of the enhance transaction to each of the curator node, the consumer node, and/or any or all other trusted nodes in the blockchain system. According to some embodiments, the method 500 may comprise returning an indication of a successful enhance transaction and/or a transaction hash back to the UI application node service (e.g., to the consumer's device). In such a manner, for example, the consumer may readily and securely provide updated or enhanced data to modify an existing customer profile that may be utilized to facilitate asynchronous communications with respect to the profile, as described herein.

Figure 6:
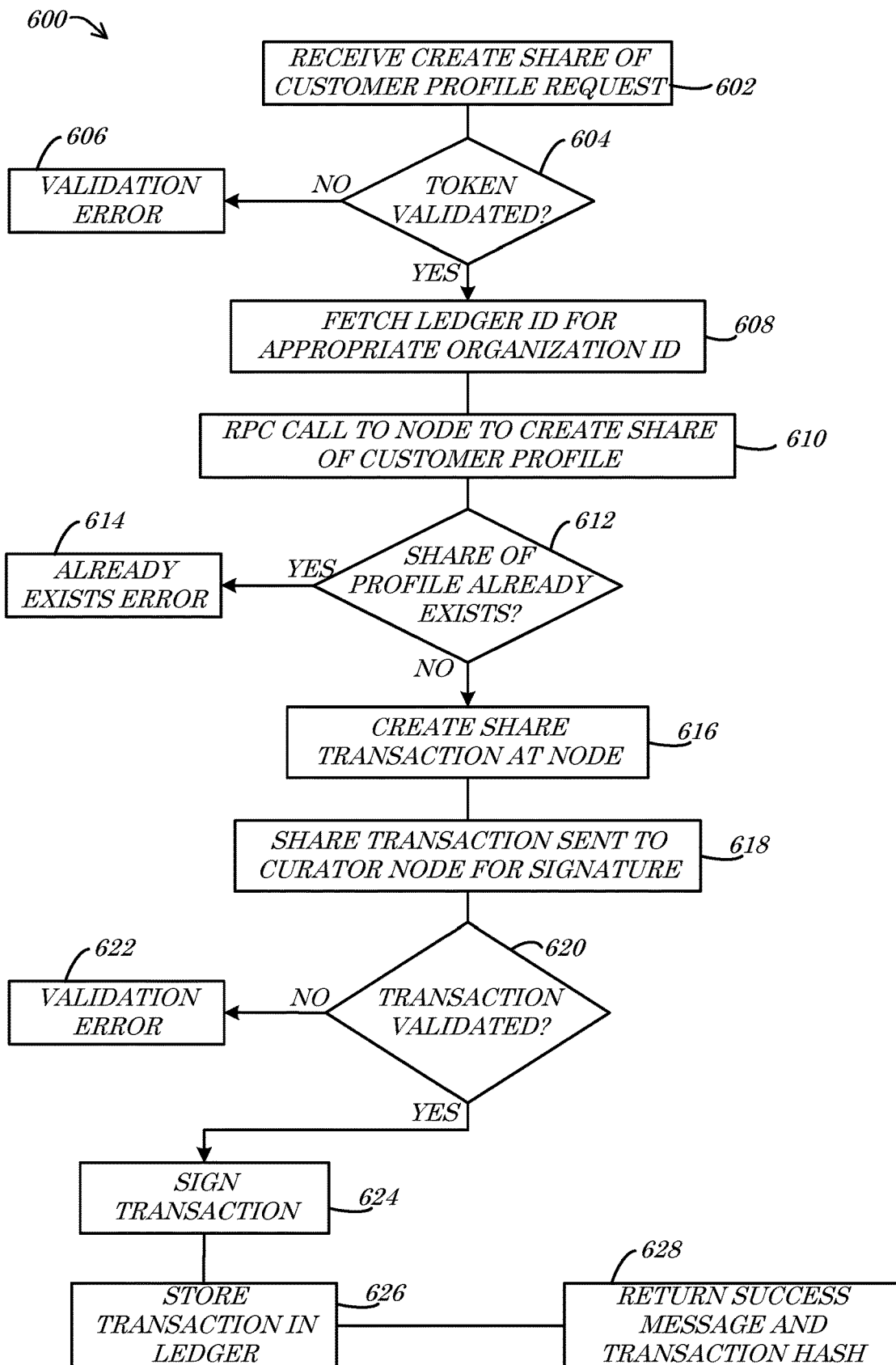
FIG. 6 is a flow diagram of a method according to some embodiments.
Figure 7:
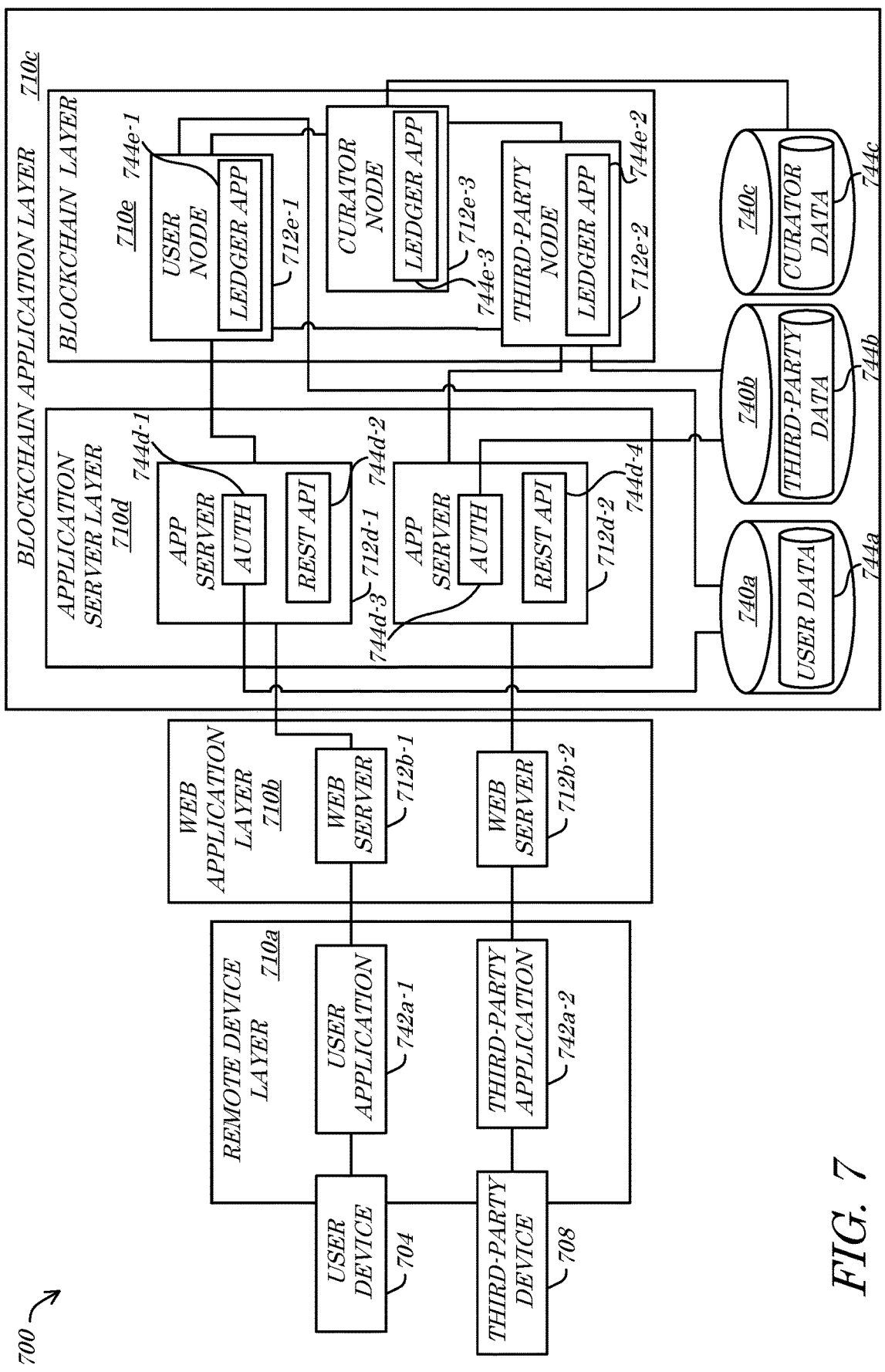
FIG. 7 is a block diagram of a system according to some embodiments.

Referring now to FIG. 6, a flow diagram of a method 600 according to some embodiments is shown. In some embodiments, the method 600 may be performed and/or implemented by and/or otherwise associated with one or more specialized and/or specially-programmed computers (e.g., one or more of the consumer devices 102a-n, 202, 302, user devices 104a-n, 204, 304, 904, company devices 106a-n, 206, third-party devices 208, 708, 908, the controller devices and/or layers 110, 210a-b, 310a-e, 710a-e, 910d-e, and/or the apparatus 1010 of FIG. 1, FIG. 2, FIG. 3, FIG. 7, FIG. 9, and/or FIG. 10 herein), computer terminals, computer servers, computer systems and/or networks, and/or any combinations thereof (e.g., by one or more multi-threaded and/or multi-core processing units of an asynchronous API-driven external application services for blockchain processing system). In some embodiments, the method 600 may be embodied in, facilitated by, and/or otherwise associated with various input mechanisms and/or interfaces (such as the interface 1020 of FIG. 10 herein). According to some embodiments, the method 600 may embody a "share" flow that comprises a non-limiting example of how a consumer may share a consumer profile record (e.g., with other users, companies, third-parties, etc.).

In some embodiments, the method 600 may comprise receiving (e.g., by an electronic processing device of an application server and/or from a mobile application of a mobile electronic device of a consumer) a request to share a consumer or customer profile, at 602. A consumer (e.g., a customer or potential customer) may utilize the mobile electronic device, for example, to input a login/user name or ID (e.g., an account identifier, consumer identifier, organization identifier, etc.), password, passphrase, biometric identifier, etc. In some embodiments, the input credentials may comprise and/or define a token that is passed to a UI application node service in communication with the mobile application being executed on the mobile electronic device. In some embodiments, the UI application service may forward the login request to a login API of an application server by generating an HTTP POST request that comprises the login credentials as JSON input. According to some embodiments, the token/credentials may be encrypted and/or compressed and/or may comprise decryption and/or decompression keys, data, hashes, etc. In some embodiments, the request may comprise data descriptive of the consumer/customer, such as PII, object ownership data, object characteristic data (e.g., year built, model year, miles driven, construction type, location, etc.), consumer preference data, and/or data permissions and/or security information (e.g., a listing of identifiers indicative of one or more other parties that are granted permission to access and/or edit the consumer's data).

According to some embodiments, the method 600 may comprise determining (e.g., by the electronic processing device of the application server) whether the token is validated, at 604. In response to the receiving of the request to share the consumer profile, for example, the electronic processing device may query a database (e.g., a security database) or other data store to identify and/or compare data stored in relation to the consumer's account, identifier, address, etc. The consumer's input may be compared, for example, to pre-stored and/or specially generated data (e.g., metadata and/or a specially generated passcode) to identify a match. In the case that the input does not match, a challenge may be transmitted, communications with the consumer may be terminated, and/or a login failure or error message may be provided to the consumer, at 606. In the case that the input matches the pre-stored/generated data, the identity and/or authorization of the consumer may be inferred and the method 500 may continue to, e.g., provide a successful login token back to the UI application node service.

In some embodiments, the method 600 may comprise fetching (e.g., by the electronic processing device of the application server) a ledger ID for an appropriate organization ID, at 608. One or more identifiers and/or other data stored in relation to the login credentials and/or request may be identified and/or retrieved, for example, by directing a relational query to a consumer database, e.g., stored by a non-transitory computer-readable memory device in communication with the electronic processing device. In some embodiments, the method 600 may comprise generating (e.g., by the electronic processing device of the application server) an RPC call to a blockchain node to share the consumer profile, at 610. The organization ID and/or the token may be embedded in and/or provided with the RPC call, for example, to provide credentialing validation and node selection data for access to the blockchain. The organization ID may be utilized to direct the RPC call to the appropriate (e.g., assigned; e.g., for multi-tenancy nodes) node in the blockchain, for example, and the login success token may be utilized by the blockchain system to verify access permissions.

According to some embodiments, the method 600 may comprise determining (e.g., by the electronic processing device of the blockchain node) whether the share of the consumer profile already exists, at 612. In response to the receiving of the request to share the consumer profile, for example, the electronic processing device may query a database (e.g., a consumer profile database) or other data store to identify and/or compare data stored in relation to the consumer's account, identifier, address, etc. The consumer's input may be compared, for example, to pre-stored data to identify a match. In the case that the input matches already stored/existing data, a failure or error message may be provided to the consumer that indicates that the share of the consumer profile (or requested shared portions thereof) already exist, at 614. In the case that the input does not match the pre-stored data, it may be inferred that the share of the profile does not already exist and the method 600 may continue to, e.g., provide an indication of a successful existing data check back to the UI application node service.

In some embodiments, the method 600 may comprise creating (e.g., by the electronic processing device of the blockchain node) a share transaction at the blockchain node, at 616. The blockchain node associated with and/or assigned to the consumer may (e.g., based on the organization ID; e.g., for multi-tenancy nodes), for example, execute a local copy of chaincode instructions to perform blockchain data storage and/or verification tasks in accordance with stored ledger/blockchain rules, thresholds, and/or logic. According to some embodiments, the creating of the share transaction may comprise storing a copy of any or all data descriptive of the transaction at the consumer's blockchain node (e.g., a first local copy of the transaction data). In some embodiments, data descriptive of the transaction may be communicated to one or more other nodes for verification, validation, signature, storage, etc.

According to some embodiments, the method 600 may comprise sending (e.g., by the electronic processing device of the consumer's blockchain node) the share transaction to a curator node for signature, at 618. The curator node may, for example, comprise a blockchain management node that interrogates a plurality of trusted nodes to verify share transactions. In some embodiments, the curator node may receive the share transaction data (or indications thereof) from the consumer's blockchain node and may execute a local copy of chaincode instructions and/or blockchain management instructions to perform various tasks triggered by the data received from the consumer's blockchain node.

In some embodiments, the method 600 may comprise determining (e.g., by an electronic processing device of the curator node) whether the transaction is validated, at 620. In response to the receiving of the request to sign the share transaction, for example, the electronic processing device of the curator node may query one or more nodes other than the consumer's node to verify the permissions and/or logic-based appropriateness of the share transaction as compared to distributed copies of the blockchain stored with respect to the consumer (e.g., keyed on the organization ID). Each queried node may, in some embodiments, compare the share transaction data to pre-stored rules and/or stored blockchain copies to identify a contextual appropriateness of the share transaction. The share transaction data may be compared to one or more object states defined by previous chaincode transactions stored in the respective distributed copies of the ledger/blockchain, for example, to verify that the share transaction is compatible with the identified states. In the case that the share transaction does not correspond to the identified states and/or stored data, a validation failure or error message may be provided back to the curator node and/or forwarded back to the consumer, at 622. In the case that the share transaction is determined to be compatible with the stored data, the appropriateness of the share transaction may be inferred and the method 600 may continue by, e.g., having the curator node sign the transaction, at 624. In some embodiments, upon signature/validation by the curator node (e.g., due to positive results being returned from each queried trusted node; at 624) a copy of the share transaction and/or a blockchain entry descriptive of the share transaction may be copied to any or all trusted nodes (e.g., a plurality of additional local copies of the transaction data) to update the distributed ledger, at 626. The share transaction may be recorded in accordance with the blockchain instructions executed by the curator node, for example, by distributing and storing a copy of a data block descriptive of the share transaction to each of the curator node, the consumer node, and/or any or all other trusted nodes in the blockchain system. According to some embodiments, the method 600 may comprise returning an indication of a successful share transaction and/or a transaction hash back to the UI application node service (e.g., to the consumer's device). In such a manner, for example, the consumer may readily and securely define share and/or access permissions for an existing customer profile that may be utilized to facilitate asynchronous communications with respect to the profile, as described herein.

IV. Asynchronous API-Driven External Application Services for Blockchain Systems Turning now to FIG. 7, a block diagram of system 700 according to some embodiments is shown. In some embodiments, the system 700 may comprise a system that enables selective and limited access to external applications for a blockchain distributed ledger system. The system 700 may comprise, for example, a user device 704 and/or a third-party device 708, each in communication with one or more of a remote device layer 710*a*, a web application layer 710*b*, and/or a blockchain application layer 710*c* (e.g., that may comprise an application server layer 710*d* and/or a blockchain layer 710*e*). According to some embodiments, the user device 704 and/or the third-party device 708 may communicate with one or more remote processing devices, such as respective web servers 712*b*-1, 712*b*-2, application servers 712*d*-1, 712*d*-2, and/or blockchain nodes, such as a user node 712*e*-1 and/or a third-party node 712*e*-2. In some embodiments, the respective nodes 712*e*-1, 712*e*-2 may be in communication with (e.g., via the blockchain layer 710*e*) a curator node 712*e*-3 that may, for example, manage and/or coordinate the signature, authentication, and/or functionality of the blockchain layer 710*e*. According to some embodiments, the system 700 may comprise and/or the user device 704 and/or the third-party device 708 may be in communication with (directly or indirectly) one or more databases 740*a*-*c*.

In some embodiments, the user device 704 and/or the third-party device 708 may be in communication with and/or define the remote device layer 710*a* via which respective applications, such as a user application 742*a*-1 and/or a third-party application 742*a*-2, may be operable to accept input from and/or cause output via one or more of the respective user device 704 and/or third-party device 708. The applications 742*a*-1, 742*a*-2 may communicate with the respective web servers 712*b*-1, 712*b*-2, for example, to provide for authentication and/or transaction implementation of the user device 704 and/or the third-party device 708. Data 744*a*-*c* stored in the databases 740*a*-*c* may be utilized, for example, to authenticate credentials, verify object states, identify operational thresholds and/or logic, execute requested transactions, etc. According to some embodiments, user data 744*a* may be accessed to authenticate credentials provided by the user device 704, for example, and/or third-party data 744b may be accessed to authenticate credentials provided by the third-party device 708. According to some embodiments, curator data 744c may be accessed to operate the blockchain layer 710e by applying blockchain logic and/or rules to selectively validate blockchain transactions that meet the specified thresholds/criteria.

According to some embodiments, functional operation of the system 700 may comprise the user device 704 accepting and/or identifying user credentials (not shown) as input into the user application 742a-1 of the remote device layer 710a. In some embodiments, the user application 742a-1 may initiate communications with a first web server 712b-1 of the web application layer 710b and pass the user credentials (or one or more indications thereof) to the first web server 712b-1 as a first login request. According to some embodiments, the first web server 712b-1 may generate a login request, such as an HTTP POST request, and send the request to a first application server 712d-1. In some embodiments, the request may be sent to and/or received by a first authorization module or API 744d-1 of the first application server 712d-1 (in the application server layer 710d). The first authorization API 744d-1 may, in response to receiving the request, for example, query a first or user database 740a and/or the user data 744a thereof to authenticate the user credentials. In some embodiments, upon a successful return and/or match of the user data 744a, the first authorization API 744d-1 (and/or the first application server 712d-1) may return an authentication success response (and/or additional lookup data) that may comprise or define a cryptographic string, such as a bearer token (e.g., a JWT). In the case of a failed authentication (e.g., invalid user credentials) a failure response may be returned. In either case, the response may be returned by the first authorization API 744d-1 (and/or the first application server 712d-1) to the first web server 712b-1 (e.g., the web application layer 710b) and on to the user application 742a-1 (e.g., the remote device layer 710a). In the case that the response indicates a success, the user may be successfully logged into the user application 742a-1. In the case of a failure response, the user may be notified of the failure and/or given the opportunity to try again.

In some embodiments, once the user is logged into the system 700 (and/or the user application 742a-1 thereof) the user may initiate a transaction by providing and/or defining transaction input via the user device 704. In the non-limiting example case of consumer profile creation and sharing to allow asynchronous communications, the user device 704 may receive and/or identify input defining (i) a profile for a consumer (or a portion thereof, such as PII, preferences, etc.) and/or (ii) the third-party application 742a-2 (e.g., collectively, "external application input"). The user may comprise, for example, an agent, broker, or representative that has been given access/permission to access a particular consumer's (or particular group of consumers') profile. In some embodiments, the user device 704 may comprise a consumer device and/or a company device (not separately depicted in FIG. 7) and the user may accordingly comprise a consumer, company employee, etc. The user may, for example, comprise any user of the system 700 that has access to a consumer profile and that has access to, signed up for, subscribed to, and/or is otherwise authorized to engage the third-party device operating the third-party device 708 to execute the third-party application 742a-2. The third-party application 742a-2 may comprise, for example, an application that is granted limited access to the blockchain layer 710e to perform one or more calculations, lookups, model executions, etc., utilizing data stored in the accessible consumer profile.

According to some embodiments, the consumer application 742a-1 may (in response to the receiving of the external application input) generate an external application execute request that is passed to the first web server 712b-1. In some embodiments, the first web server 712b-1 may generate a corresponding external application execute request, such as an HTTP POST request, that is forwarded to a first REST API 744d-2 of the first application server 712d-1. The first REST API 744d-2 may, in response to receiving the transaction (e.g., "external application execute") request, for example, call the user node 712e-1 (e.g., via an RPC) of the blockchain layer 710e. According to some embodiments, the transaction request may be received by a first ledger application 744e-1 stored and/or executed on the user node 712e-1. The first ledger application 744e-1 may, for example, execute chaincode (not separately shown in FIG. 7) and/or manage distributed ledger verifications and communications with either or both of the third-party node 712e-2 (e.g., having a second ledger application 744e-2) and the curator node 712e-3 (e.g., having a third ledger application 744e-3). Information indicative of the "external application execute" transaction may be stored, once signed and/or verified by the first ledger application 744e-1 and/or by the curator node 712e-3 (and/or the third ledger application 744e-3 thereof), for example, in any or all of the nodes 712e-1, 712e-2, 712e-3, and/or in any or all of the databases 740a-c, such as in the user data 744a of the first database 740a.

According to some embodiments, the blockchain layer 710e (e.g., the user node 712e-1 and/or the curator node 712e-3) may return an indication of successful blockchain transaction verification and/or entry, by returning a transaction hash to the first application server 712d-1 and/or to the first REST API 744d-2 thereof. The first application server 712d-1 and/or to the first REST API 744d-2 may then, for example, forward the transaction hash to the first web server 712b-1, which may forward or pass the transaction hash to the user application 742a-1. In such a manner, for example, the user may securely identify a consumer profile and the third-party application 742a-2 with a record thereof being stored in the blockchain application layer 710c. In some embodiments, and continuing the non-limiting example of a consumer profile described herein, the third-party application 742a-2 may comprise instructions that when executed (e.g., by the second application server 712d-2) may provide output, such as calculations, metrics, measures, scores, ranks, etc., based on the consumer profile data to which it is permitted limited access via the system 700. The third-party device 708 may comprise, in some embodiments, any type or configuration of a computerized processing device, such as a PC, laptop computer, computer server, database system, and/or other electronic device, devices, or any combination thereof. In some embodiments, such a third-party device 708 may be owned and/or operated by a third-party (i.e., an entity different than any entity owning and/or operating either the user device 704 or the blockchain application layer 710c; such as a data provider entity). The third-party device 708 may, for example, be owned and/or operated by a data and/or data service provider, such as Dun & Bradstreet® Credibility Corporation of Short Hills, NJ (and/or a subsidiary thereof, such as Hoovers™), Deloitte® Development, LLC of London, GB, Experian™ Information Solutions, Inc. of Costa Mesa, CA, EagleView® Technologies, Inc. of Bellevue, WA, and/or Edmunds.com®, Inc. of Santa Monica, CA. In some embodiments, the third-party device 708, via execution of the third-party application 742*a*-2, may supply and/or provide data, such as aerial imagery, Global Positioning System (GPS) data, vehicle diagnostic data, traffic camera images, blueprints, maps, risk metrics, weather data, health statistics, data forecasting metrics, etc., to the user device 704. In some embodiments, the third-party device 708 may comprise a plurality of devices and/or may be associated with a plurality of third-party entities.

In some embodiments, functional operation of the system 700 may comprise the application server layer 710*d* (and/or the web application layer 710*b*) executing a call to the third-party device 708. In response to the identification of the third-party application 742*a*-2 by the user device 704, for example, the third-party application 742*a*-2 may be granted temporary and/or limited access to the data 744*a*-*c*. According to some embodiments, the third-party device 708 may accept and/or identify third-party and/or user credentials (not shown) as input into the third-party application 742*a*-2 of the remote device layer 710*a*. In some embodiments, the third-party application 742*a*-2 may initiate communications with a second web server 712*b*-2 of the web application layer 710*b* and pass the third-party/user credentials (or one or more indications thereof) to the second web server 712*b*-2 as a second login request. In some embodiments, the second login request may not be necessary, such as in the case that the third-party application 742*a*-2 is called by the web application layer 710*b* and/or the blockchain application layer 710*c*. In some embodiments, the second login request may comprise a two-factor authentication challenge/response. According to some embodiments, the second web server 712*b*-2 may generate a login request, such as an HTTP POST request, and send the request to a second application server 712*d*-2. In some embodiments, the request may be sent to and/or received by a second authorization module or API 744*d*-3 of the second application server 712*d*-2 (in the application server layer 710*d*). The second authorization API 744*d*-3 may, in response to receiving the request, for example, query a second or third-party database 740*b* and/or the third-party data 744*b* thereof to authenticate the third-party credentials. In some embodiments, upon a successful return and/or match of the third-party data 744*b*, the second authorization API 744*d*-3 (and/or the second application server 712*d*-2) may return an authentication success response (and/or additional lookup data) that may comprise or define a cryptographic string, such as a bearer token (e.g., a JWT). In the case of a failed authentication (e.g., invalid third-party credentials and/or two-factor authentication response) a failure response may be returned. In either case, the response may be returned by the second authorization API 744*d*-3 (and/or the second application server 712*d*-2) to the second web server 712*b*-2 (e.g., the web application layer 710*b*) and on to the third-party application 742*a*-2 (e.g., the remote device layer 710*a*). In the case that the response indicates a success, the third-party and/or the third-party application 742*a*-2 may be successfully logged into the blockchain layer 710*e*—e.g., for a limited time, purpose, with limited and/or specified rights, etc. In the case of a failure response, the third-party (and/or the user) may be notified of the failure and/or given the opportunity to try again.

In some embodiments, once the third-party and/or the third-party application 742*a*-2 is logged into the system 700, the third-party application 742*a*-2 may initiate a transaction by providing and/or defining transaction input to the second application server 712*d*-2. In the non-limiting example case of limited access to external applications for acting upon consumer profile data, the second application server 712*d*-2 may identify and execute the third-party application 742*a*-2 and/or instructions stored in relation thereto, for example, to act upon the consumer profile and/or blockchain data to which the third-party application 742*a*-2 has been given access. According to some embodiments, the third-party application 742*a*-2 may (in response to the receiving of the call or request to initiate) generate an access request that is passed to the second web server 712*b*-2. In some embodiments, the second web server 712*b*-2 may generate a corresponding access request, such as an HTTP POST request, that is forwarded to a second REST API 744*d*-4 of the second application server 712*d*-2. The second REST API 744*d*-4 may, in response to receiving the transaction (e.g., access) request, for example, call the third-party node 712*e*-2 (e.g., via an RPC) of the blockchain layer 710*e*. According to some embodiments, the transaction request may be received by the second ledger application 744*e*-2 stored and/or executed on the third-party node 712*e*-2. The second ledger application 744*e*-2 may, for example, execute chaincode (not separately shown in FIG. 7) and/or manage distributed ledger verifications and communications with either or both of the user node 712*e*-1 (e.g., having the first ledger application 744*e*-1) and the curator node 712*e*-3 (e.g., having the third ledger application 744*e*-3). Information indicative of the access transaction may be stored, once signed and/or verified by the second ledger application 744*e*-2 and/or by the curator node 712*e*-3 (and/or the third ledger application 744*e*-3 thereof), for example, in any or all of the nodes 712*e*-1, 712*e*-2, 712*e*-3, and/or in any or all of the databases 740*a*-*c*, such as in the third-party data 744*b* of the second database 740*b*.

According to some embodiments, the blockchain layer 710*e* (e.g., the third-party node 712*e*-2 and/or the curator node 712*e*-3) may return an indication of successful blockchain transaction verification and/or entry and/or an indication of data from one or more shared consumer profiles, by returning a transaction hash and/or a listing of consumer profile states, variable values, metrics, etc., to the second application server 712*d*-2 and/or to the second REST API 744*d*-4 thereof. The second application server 712*d*-2 and/or to the second REST API 744*d*-4 may then, for example, forward the transaction hash and/or the retrieved consumer data to the second web server 712*b*-2, which may forward or pass the transaction hash and/or the listing of states to the third-party application 742*a*-2. According to some embodiments, the third-party application 742*a*-2 may utilize the data returned from the blockchain application layer 710*c* to output information indicative of a third-party processing result. According to some embodiments, the output may be provided via the user device 704, e.g., as routed in accordance with stored rules implemented by the application web server 710*d*.

In such a manner, for example, the user may sign-up for, subscribe to, and/or otherwise invoke the external services provided by the third-party application 742*a*-2 and have limited access to the external services granted and managed by the application server layer 710*d*. In some embodiments, the application server layer 710*d* may be owned and/or operated by an entity distinct from the entity that owns and/or operates the blockchain layer 710*e*. The entity owning and/or operating the application server layer 710*d* may, for example, comprise an entity that engages with an entity providing blockchain services via the blockchain layer 710*e* and may itself manage access to such blockchain services, by providing selective and limited access to external applications, as described herein.

Fewer or more components 704, 708, 710a-e, 712b-1, 712b-2, 712d-1, 712d-2, 712e-1, 712e-2, 712e-3, 740a-c, 742a-1, 742a-2, 744a-c, 744d-1, 744d-2, 744d-3, 744d-4, 744e-1, 744e-2, 744e-3 and/or various configurations of the depicted components 704, 708, 710a-e, 712b-1, 712b-2, 712d-1, 712d-2, 712e-1, 712e-2, 712e-3, 740a-c, 742a-1, 742a-2, 744a-c, 744d-1, 744d-2, 744d-3, 744d-4, 744e-1, 744e-2, 744e-3 may be included in the system 700 without deviating from the scope of embodiments described herein. In some embodiments, the components 704, 708, 710a-e, 712b-1, 712b-2, 712d-1, 712d-2, 712e-1, 712e-2, 712e-3, 740a-c, 742a-1, 742a-2, 744a-c, 744d-1, 744d-2, 744d-3, 744d-4, 744e-1, 744e-2, 744e-3 may be similar in configuration and/or functionality to similarly named and/or numbered components as described herein. In some embodiments, the system 700 (and/or portions thereof) may comprise an asynchronous API-driven external application services for blockchain program, system, and/or platform programmed and/or otherwise configured to execute, conduct, and/or facilitate the methods 400, 500, 600, 800, 900 of FIG. 4, FIG. 5, FIG. 6, FIG. 8, and/or FIG. 9 herein, and/or portions or combinations thereof.

Figure 8:
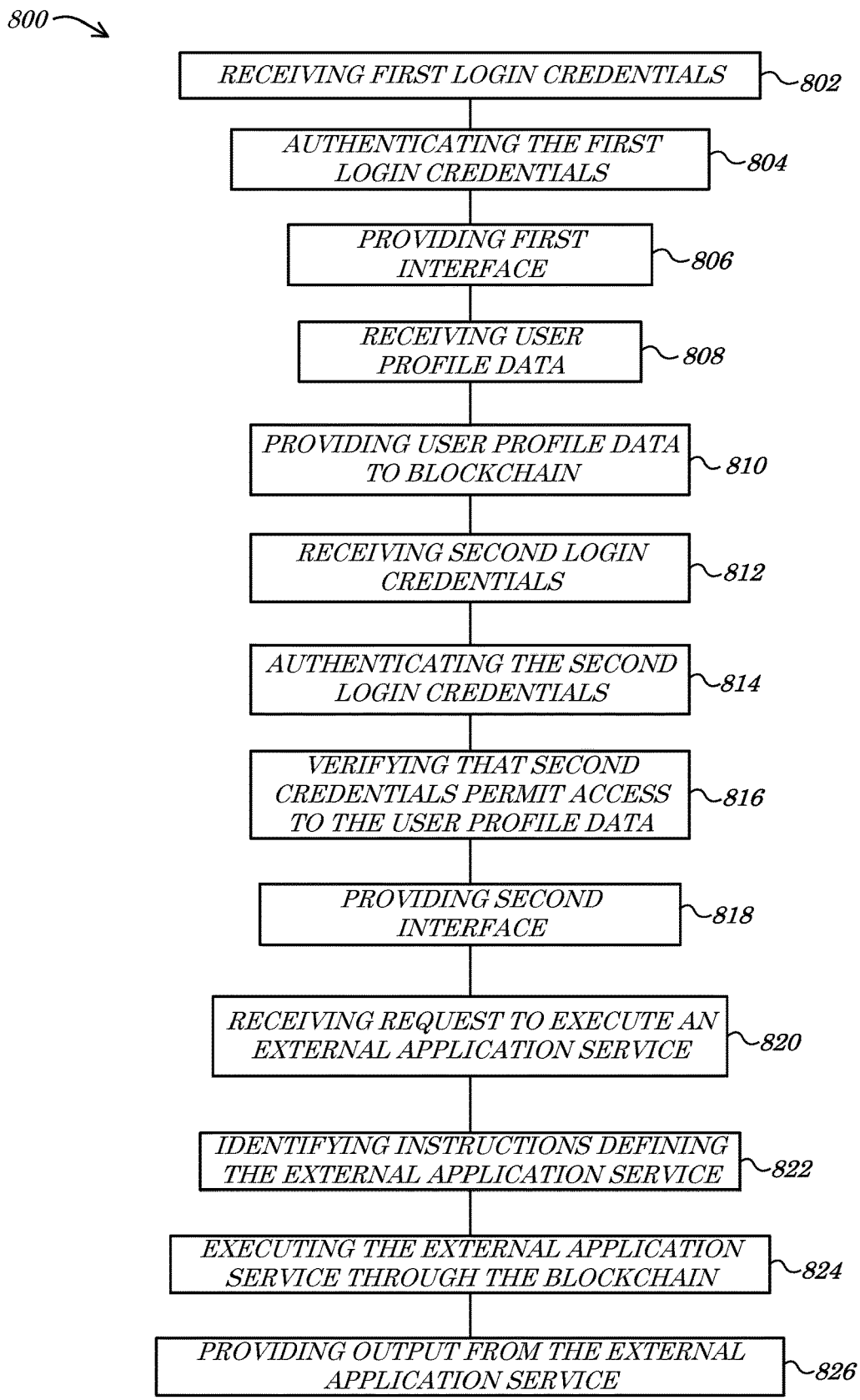
FIG. 8 is a flow diagram of a method according to some embodiments.

Turning to FIG. 8, for example, a flow diagram of a method 800 according to some embodiments is shown. In some embodiments, the method 800 may be performed and/or implemented by and/or otherwise associated with one or more specialized and/or specially-programmed computers (e.g., one or more of the consumer devices 102a-n, 202, 302, user devices 104a-n, 204, 304, 904, company devices 106a-n, 206, third-party devices 208, 708, 908, the controller devices and/or layers 110, 210a-b, 310a-e, 710a-e, 910d-e, and/or the apparatus 1010 of FIG. 1, FIG. 2, FIG. 3, FIG. 7, FIG. 9, and/or FIG. 10 herein), computer terminals, computer servers, computer systems and/or networks, and/or any combinations thereof (e.g., by one or more multi-threaded and/or multi-core processing units of an asynchronous API-driven external application services for blockchain processing system). In some embodiments, the method 800 may be embodied in, facilitated by, and/or otherwise associated with various input mechanisms and/or interfaces (such as the interface 1020 of FIG. 10 herein). According to some embodiments, the method 800 may embody an "external application execute" flow that comprises a non-limiting example of how an external application may be granted limited access to a private blockchain in accordance with embodiments presented herein.

In some embodiments, the method 800 may comprise receiving (e.g., by an electronic processing device of an application server and/or API layer and/or from a mobile application of a mobile electronic device) first login credentials, at 802. A consumer (e.g., a customer or potential customer) and/or other user may utilize the mobile electronic device, for example, to input a login/user name or ID (e.g., an account identifier, consumer identifier, organization identifier, etc.), password, passphrase, biometric identifier, etc. In some embodiments, the input credentials may comprise and/or define a token that is passed to a UI application node service in communication with the mobile application being executed on the mobile electronic device. In some embodiments, the UI application service may forward the login request to a login API of an application server and/or API layer by generating an HTTP POST request that comprises the login credentials as JSON input. According to some embodiments, the token/credentials may be encrypted and/or compressed and/or may comprise decryption and/or decompression keys, data, hashes, etc.

According to some embodiments, the method 800 may comprise authenticating (e.g., by the electronic processing device of the application server) the first login credentials, at 804. In response to the receiving of the first login credentials (e.g., at 802), for example, the electronic processing device may query a database (e.g., a security database) or other data store to identify and/or compare data stored in relation to the consumer's/user's account, identifier, address, etc. The first login credentials may be compared, for example, to pre-stored and/or specially generated data (e.g., metadata and/or a specially generated passcode) to identify a match. In the case that the input does not match, a challenge may be transmitted, communications with the consumer/user may be terminated, and/or a login failure or error message may be provided. In the case that the input matches the pre-stored/generated data, the identity and/or authorization of the consumer/user may be inferred and the method 800 may continue to, e.g., provide a successful login token back to the UI application node service.

In some embodiments, the method 800 may comprise providing (e.g., by the electronic processing device of the application server and/or API layer and/or to the mobile application of the mobile electronic device) a first interface, at 806. In response to a successful login, for example, the application server and/or API layer may identify one or more interface components and/or variable values that are transmitted to the mobile device for outputting to the consumer/user. According to some embodiments, the interface (and/or individual components thereof) may be tailored to the consumer/user, e.g., based on their login credentials, account ID, etc. In the case that the user comprises a consumer, for example, the interface may comprise components that query the consumer for input (i) defining consumer profile data (e.g., a user profile record), (ii) defining enhancements to consumer profile data, and/or (iii) defining permissions for accessing consumer profile data. In the case that the user comprises an agent or company, in some embodiments, the interface may comprise components that query the user for input (i) requesting access to one or more consumer profiles and/or (ii) requesting execution of an external application.

According to some embodiments (such as in the case that the user comprises a consumer defining a consumer profile), the method 800 may comprise receiving (e.g., by the electronic processing device of the application server and/or API layer and/or from a mobile application of a mobile electronic device) user profile data, at 808. The consumer/user may, for example, submit a request to define, create, enhance, and/or modify consumer data (e.g., a user profile record) stored in a blockchain to which the application server and/or API layer provides authentication and access management services. In some embodiments, the profile data may comprise any information descriptive of the consumer, the consumer's possessions, preferences, characteristics, etc. The consumer (or other user) profile data may comprise, for example, PII, such as Social Security Numbers, bank account numbers, home address, health data, etc. In some embodiments, the user profile data may be received via one or more components of the first interface. According to some embodiments, the user profile data may comprise data identifying the user, as well as data defining at least one authorized user that is granted permission to access the user profile record.

In some embodiments, the method 800 may comprise providing (e.g., by the electronic processing device of the application server and/or to a node of the blockchain) an indication of the user profile data to the blockchain, at 810. The application server may, for example, forward a request to create, enhance, and/or share the profile data to a selected blockchain node. In some embodiments, the blockchain node may be selected based on the identity of the consumer/user (e.g., based on the first login credentials and/or stored data associated therewith). Different nodes of the blockchain may be logically assigned to different users, consumers, companies, groups of users, consumers, and/or companies, etc. (e.g., multi-tenancy). According to some embodiments, one or more identifiers and/or other data stored in relation to the first login credentials may be identified and/or retrieved, for example, by directing a relational query to a consumer/user database, e.g., stored by a non-transitory computer-readable memory device in communication with the electronic processing device of the application server. In some embodiments, the application server may generate (e.g., by the electronic processing device thereof) an RPC call to the blockchain node to create/enhance/share the consumer/user profile. An organization ID and/or the token provided in response to the successful login utilizing the first login credentials may be embedded in and/or provided with the RPC call, for example, to provide credentialing validation and node selection data for access to the blockchain. The organization ID may be utilized to direct the RPC call to the appropriate (e.g., assigned) node in the blockchain, for example, and the login success token may be utilized by the blockchain system to verify access permissions.

According to some embodiments, the method 800 may comprise receiving (e.g., by the electronic processing device of the application server and/or from a second mobile application of a second mobile electronic device) second login credentials, at 812. A user different than the first user/consumer (e.g., a second user) may utilize the second mobile electronic device, for example, to input a second login/user name or ID (e.g., an account identifier, consumer identifier, organization identifier, etc.), password, passphrase, biometric identifier, etc. In some embodiments, the second input credentials may comprise and/or define a second token that is passed to the UI application node service in communication with the second mobile application being executed on the second mobile electronic device. In some embodiments, the UI application service may forward the second login request to the login API of the application server by generating a second HTTP POST request that comprises the second login credentials as JSON input. According to some embodiments, the second token/credentials may be encrypted and/or compressed and/or may comprise decryption and/or decompression keys, data, hashes, etc.

In some embodiments, the method 800 may comprise authenticating (e.g., by the electronic processing device of the application server) the second login credentials, at 814. In response to the receiving of the second login credentials (e.g., at 812), for example, the electronic processing device may query a database (e.g., the security database) or other data store to identify and/or compare data stored in relation to the second consumer's/user's account, identifier, address, etc. The second login credentials may be compared, for example, to pre-stored and/or specially generated data (e.g., metadata and/or a specially generated passcode) to identify a match. In the case that the input does not match, a challenge may be transmitted, communications with the second consumer/user may be terminated, and/or a login failure or error message may be provided. In the case that the input matches the pre-stored/generated data, the identity and/or authorization of the second consumer/user may be inferred and the method 800 may continue to, e.g., provide a successful login token back to the UI application node service.

According to some embodiments, the method 800 may comprise verifying (e.g., by the electronic processing device of the application server) that the second login credentials permit access to the consumer/user profile, at 816. In response to the receiving of the second login credentials (e.g., at 812) and/or in response to receiving a request to access the profile, for example, the electronic processing device may query a database (e.g., the security database) or other data store to identify stored data that defines access rights and/or privileges (e.g., a share instance) with respect to one or more consumer/user profiles. The second login credentials may be compared, for example, to pre-stored data to identify a match (e.g., an indication that the second user comprises the at least one authorized user that has been granted access to the user profile). In the case that the second login credentials (and/or associated second data, such as a second user ID) does not match, a challenge may be transmitted, communications with the second consumer/user may be terminated, and/or an access failure or error message may be provided. In the case that the second data matches the pre-stored data, the permission to access the shared profile data may be inferred and the method 800 may continue to, e.g., provide a successful login token back to the UI application node service.

In some embodiments, the method 800 may comprise providing (e.g., by the electronic processing device of the application server and/or to the second mobile application of the second mobile electronic device) a second interface, at 818. In response to a successful second login, for example, the application server may identify one or more interface components and/or variable values that are transmitted to the second mobile device for outputting to the second consumer/user. According to some embodiments, the second interface (and/or individual components thereof) may be tailored to the second consumer/user, e.g., based on their login credentials, account ID, etc. In the case that the second user comprises a second consumer, for example, the second interface may comprise second components that query the second consumer for input (i) defining second consumer profile data, (ii) defining enhancements to second consumer profile data, and/or (iii) defining permissions for accessing second consumer profile data. In the case that the second user comprises a second agent or company, in some embodiments, the second interface may comprise second components that query the second user for input (i) requesting access to one or more second consumer profiles/records and/or (ii) requesting execution of a second external application.

According to some embodiments, the method 800 may comprise receiving (e.g., by the electronic processing device of the application server) a request to execute an external application service, at 820. After the second login is deemed successful, for example, the second user may request that a particular external application service be permitted limited access to the blockchain to operate upon the user profile record (e.g., any or all profile data to which the second user is permitted access as an authorized user). According to some embodiments, the request may be received via an element of the second interface. In some embodiments, the request may be parsed and/or analyzed by performing a verification check to determine whether the second user is authorized to execute the requested external application. Some or all external applications may require a subscription, registration, and/or payment of a fee to utilize, for example, and the API layer/application server may query stored data to verify whether any such requirements are met (or not) by the second user (e.g., prior to proceeding further or prior to executing the external application).

In some embodiments, the method 800 may comprise identifying (e.g., by the electronic processing device of the application server and/or API layer) instructions defining the external application service, at 822. Identifying information descriptive of the external application service may be provided in the request at 820 and utilized to lookup details for the service, for example, and/or information stored with respect to the second user may be utilized to identify the external application and/or instructions thereof. According to some embodiments, the instructions may be called and/or retrieved from one or more third-party devices associated with the external application service. A third-party device associated with the external application service may be called, for example, to request that the service be executed on the blockchain (e.g., in response to the second user's request). In some embodiments, a login and/or verification sequence may be initiated to verify and/or authenticate communications with the third-party device/service. According to some embodiments, such as in the case that the call to the third-party service is initiated by the API layer/application server, credentialing may not be required. In some embodiments, once identified, the instructions may be uploaded to the API layer/application server, cached, and/or otherwise stored and/or prepared (e.g., compiled) for execution.

According to some embodiments, the method 800 may comprise executing (e.g., by the electronic processing device of the API layer and/or the application server) the external application service through the blockchain, at 824. An instance of the instructions defining the external application service may be initiated, for example, and given limited access to any or all data stored in the blockchain. In some embodiments, the external application service may be executed by initiating calls (e.g., one or more RPCs) to the blockchain utilizing credentials supplied by the API layer. According to some embodiments, the external application service may conduct calculations and/or other operations on the data from the blockchain within the blockchain layer and/or within the application server/API layer and return one or more results/output to the API layer/application server. In such a manner, for example, data stored in the blockchain (e.g., a private blockchain) may be operated upon by the external application service without the data leaving the secure perimeter of the API layer. According to some embodiments, and in accordance with the blockchain operating procedures, an indication of the execution of the external services application may be stored in the blockchain.

In some embodiments, the method 800 may comprise providing (e.g., by the electronic processing device of the API layer and/or the application server) output from the external application service, at 826. The output/results from the external application service instance may be stored in the blockchain and/or at the API layer, for example, and forwarded back to the second user (e.g., in response to the second user's request). The second user may accordingly benefit from having third-party (e.g., external) applications operate upon the profile data without compromising the profile data (e.g., via exposure to non-trusted third-party nodes). Management of external application services via the API layer/application server may also provide for a convenient subscription and/or payment management platform that, e.g., (i) registers and/or subscribes users with third-parties, (ii) verifies registrations and/or subscriptions, (iii) charges users for access to external application services, and/or (iv) provides payment to one or more third-parties in exchange for external application service execution (e.g., monthly or annually or on a per-execution basis).

Figure 9:
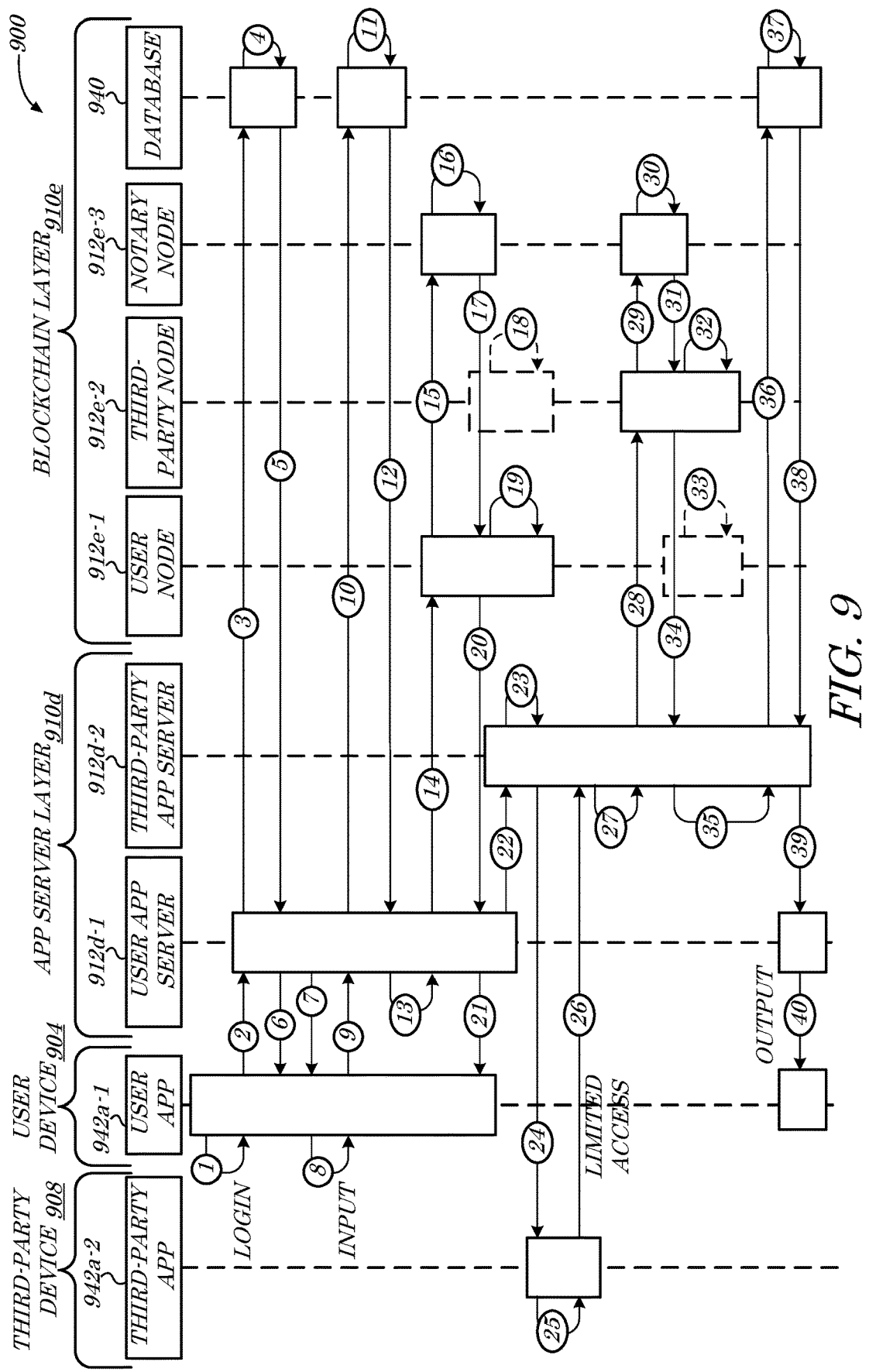
FIG. 9 is a systemic flow diagram of a method according to some embodiments.

Referring now to FIG. 9, a systemic flow diagram of a method or process 900 according to some embodiments is shown. In some embodiments, the process 900 may comprise and/or define a method for asynchronous API-driven external application services for blockchain. The process 900 may, for example, be executed by various hardware and/or logical components via interactive communications, which may involve communications between any or all of a user device 904, a third-party device 908, an application (or API) server layer 910*d*, and/or a blockchain layer 910*e*. According to some embodiments, the application server layer 910*d* may comprise a user application server 912*d*-1 and/or a third-party application server 912*d*-2. In some embodiments, the blockchain layer 910*e* may comprise a user node 912*e*-1, a third-party node 912*e*-2, and/or a notary node 912*e*-3. According to some embodiments, any or all of the devices 904, 908, 910*d*-*e* may comprise and/or be in communication with a memory (e.g., database) 940. In some embodiments, the user device 904 may comprise and/or may execute a user application 942*a*-1 and/or the third-party device 908 may comprise and/or execute a third-party application 942*a*-2.

In some embodiments, the process 900 (e.g., for asynchronous API-driven external application services for blockchain) may comprise receiving a first login request by the user application 942*a*-1 of the user device 904, at "1". The user device 904 may receive input from a user (not shown), such as a consumer, agent, broker, representative, employee, etc., that identifies, for example, a first user ID and password (e.g., first credentials). According to some embodiments, the user device 904 may pass the first credentials to the user application server 912*d*-1 of the application server layer 910*d*, at "2". According to some embodiments, the user application 942*a*-1 may identify a communication address of the user application server 912*d*-1 (and/or the application server layer 910*d*) and transmit an indication of the first login credentials (e.g., a token or key) to the user application server 912*d*-1 (and/or the application server layer 910*d*). The transmitting at "2" may, in some embodiments, result from an automatic activation of a hard-coded network address or remote identifier of the user application server 912*d*-1 (and/or the application server layer 910*d*) embedded within and/or accessible to the user application 942*a*-1. In some embodiments, the user application server 912*d*-1 (and/or the application server layer 910*d*) may pass the first credentials to, call, and/or query the database 940 (e.g., a security database), at "3". The user application server 912*d*-1 (and/or the application server layer 910*d*) may, for example, call the database 940 (and/or the blockchain layer 910*e*) to authenticate or validate the first credentials based on a comparison of the first credentials to login/security data stored in the database 940. In some embodiments, the database 940 (and/or an associated security protocol, application, layer, etc.; not separately shown) may compare the first credentials to stored data to determine whether the first credentials are valid, at "4".

According to some embodiments, the database 940 (and/or the blockchain layer 910*e*) may return (e.g., in response to the request sent/received at "3") a result of the authentication to the user application server 912*d*-1 (and/or the application server layer 910*d*), at "5". In some embodiments, the result may comprise an indication of success or failure for the (first) login attempt and/or an indication of a token or hash (e.g., for future verification of authentication).

According to some embodiments, the result may comprise an indication of data stored in relation to the first credentials, such as one or more identifiers (e.g., an organization, account, and/or user identifier). In some embodiments, the user application server 912d-1 (and/or the application server layer 910d) may pass an indication of the login result to the user device 904 (and/or the user application 942a-1), at "6". Failed login attempts may produce an outputting of an indication (e.g., audible, visual, and/or otherwise) of the failure or an error by the user application 942a-1, for example, while successful login attempts may be indicated by a success message. In some embodiments, successful login attempts may also or alternatively trigger a provision of a first interface by the user application server 912d-1 (and/or the application server layer 910d) and to the user device 904 (and/or the user application 942a-1), at "7". The first interface may, for example, comprise input and/or interactive elements (e.g., a GUI) that permit the user to enter profile data, request shared data, and/or kickoff external applications.

In some embodiments, the process 900 may comprise receiving first input (e.g., via the first interface) by the user application 942a-1 of the user device 904, at "8". The user device 904 may receive the first input from the user, for example, that identifies one or more of a create, enhance, and/or share profile request and/or a third-party (e.g., external) application execution request. According to some embodiments, the user device 904 may pass the first input to the user application server 912d-1 of the application server layer 910d, at "9". In some embodiments, the user application server 912d-1 (and/or the application server layer 910d) may pass the first input to, call, and/or query the database 940 (e.g., a relational database instance), at "10". The user application server 912d-1 (and/or the application server layer 910d) may, for example, call the database 940 (and/or the blockchain layer 910e) to lookup various related data and/or identifiers (e.g., a ledger identifier) and/or other data related to the first credentials and/or user. According to some embodiments, the query/request to the database 940 may include an indication of an account, user, and/or organization identifier (e.g., acquired from the user device 904 and/or returned in the login request response at "5"). In some embodiments, the database 940 (and/or an associated security protocol, application, layer, etc.; not separately shown) may utilize data provided in the query at "10" to identify data stored in relation to the first credentials/user that is responsive to the query/request, at "11". According to some embodiments, the database 940 (and/or the blockchain layer 910e) may return (e.g., in response to the query/request sent/received at "10") a result of the query/request to the user application server 912d-1 (and/or the application server layer 910d), at "12". In some embodiments, the result may comprise an indication of a ledger identifier assigned to and/or stored in association with data descriptive of the user.

According to some embodiments, the user application server 912d-1 (and/or the application server layer 910d) may utilize the data returned at "12" to structure a call (e.g., an RPC) to a particular component of the blockchain layer 910e, such as the user node 912e-1, at "13". The user application server 912d-1 (and/or the application server layer 910d) may, for example, generate a call descriptive of the requested transaction (e.g., create, enhance, share, execute) and transmit the call to the user node 912e-1, at "14". In some embodiments, the user node 912e-1 may receive the call and pass data descriptive of the transaction to the notary node 912e-3 for signature/verification, at "15". According to some embodiments, the notary node 912e-3 may execute chaincode and/or other stored logic and/or rules defining operational parameters of the blockchain layer 910e to determine whether the requested transaction complies with the stored rules/logic, at "16". The processing by the notary node 912e-3 at "16" may comprise verifying the that the transaction is in compliance with previously stored blockchain data, verifying that the user is authorized to execute the transaction, signing (e.g., cryptographic confirmation) the transaction, and/or storing an indication of the transaction (and/or the request and/or verification processing) in a local copy of the blockchain. According to some embodiments, the notary node 912e-3 may return a response, at "17". According to some embodiments, such as shown by the dotted line for the third-party node 912e-2 at "18" in FIG. 9, the response from the notary node 912e-3 may be transmitted to one or multiple nodes, such as the third-party node 912e-2. The third-party node 912e-2 may, in some embodiments, receive an indication of the signed/verified transaction and execute local chaincode to append/update a local copy of the blockchain, at "18".

In some embodiments, the response from the notary node 912e-3 may be received by the user node 912e-1 (and/or other nodes, not shown in FIG. 9). The user node 912e-1 may, in some embodiments, receive an indication of the signed/verified transaction and execute local chaincode to append/update a local copy of the blockchain, at "19". According to some embodiments, the user node 912e-1 may return an indication of the signing/verification to the user application server 912d-1 (and/or the application server layer 910d), at "20". In some embodiments, the user application server 912d-1 (and/or the application server layer 910d) may return an indication of the success and/or failure of the signing/verification to the user device 904, at "21".

According to some embodiments, such as in the case that the transaction request defined and/or indicated by the first input received at "8" comprises a request to execute a third-party/external application on the blockchain, the user application server 912d-1 (and/or the application server layer 910d) may call or invoke the third-party application by signaling the third-party application server 912d-2, at "22". In response to the call at "22", the third-party application server 912d-2 may identify instructions defining the requested third-party/external application service, at "23". The third-party application server 912d-2 may, for example, lookup code defining the external service (e.g., stored locally and/or on the database 940) and/or may identify a source for the code and/or for an authorization to execute the code, such as the third-party device 908. In some embodiments, the third-party application server 912d-2 may send a request to the third-party device 908 (and/or the third-party application 942a-2 thereof) to initiate the external application service, at "24". According to some embodiments, the request at "24" may comprise an indication of the user, third-party login credentials for the user (and/or for the application server layer 910d), an account identifier, and/or a subscription code and/or identifier.

In some embodiments, the third-party application 942a-2 may determine whether the request at "24" is authorized and/or may identify the requested code, at "25". The third-party application 942a-2 may, for example, verify that the user and/or the application server layer 910d (and/or the third-party application server 912d-2 thereof) is authorized to execute the external application service by comparing credentials, account data, payment information, etc., to stored verification data. According to some embodiments, the third-party application 942a-2 may determine at "25" whether instructions/code stored by and/or available to the third-party application server 912d-2 are the most current version. In some embodiments, the third-party application 942a-2 may provide a response to the request from the third-party application server 912d-2, at "26". In some embodiments, such as in the case that the response from the third-party application 942a-2 at "26" comprises an execution of instructions/code stored on the third-party device 908, the response at "26" may comprise an instance of limited access to the blockchain layer 910e, e.g., through the application server layer 910d. In such an embodiment, the response at "26" may also or alternatively comprise a request to access particular data stored on the blockchain (e.g., with respect to at least one consumer profile that the user having requested the external application service has access to).

According to some embodiments, the third-party application server 912d-2 may receive the response/request sent by the third-party application 942a-2 at "26" and may utilize information contained and/or defined therein to structure and/or generate a call to the blockchain layer 910e, at "27". In the case that the communication from the third-party application 942a-2 comprises a request to retrieve certain data from the blockchain layer 910e, the call may be structured to identify and/or request the certain data. In the case that the communication from the third-party application 942a-2 comprises an identification and/or definition of external application service instructions (e.g., a pointer, access code, update, hash, etc.), the call may be structured to idenfity and/or define the instructions based on a local execution of the instructions/code (e.g., by the third-party application server 912d-2). In some embodiments, the user application server 912d-1 (and/or the application server layer 910d) may generate a call descriptive of the requested transaction (e.g., external application data access) and transmit the call to the third-party node 912e-2, at "28". In some embodiments, the third-party node 912e-2 may receive the call and pass data descriptive of the transaction to the notary node 912e-3 for signature/verification, at "29". According to some embodiments, the notary node 912e-3 may execute chaincode and/or other stored logic and/or rules defining operational parameters of the blockchain layer 910e to determine whether the requested transaction complies with the stored rules/logic, at "30". The processing by the notary node 912e-3 at "30" may comprise verifying the that the transaction is in compliance with previously stored blockchain data, verifying that the user and/or external application is authorized to execute the transaction, signing (e.g., cryptographic confirmation) the transaction, and/or storing an indication of the transaction (and/or the request and/or verification processing) in a local copy of the blockchain. According to some embodiments, the notary node 912e-3 may return a response to the third-party node 912e-2, at "31". The third-party node 912e-2 may, in some embodiments, receive an indication of the signed/verified transaction and execute local chaincode to append/update a local copy of the blockchain, at "32". According to some embodiments, such as shown by the dotted line for the user node 912e-1 at "33" in FIG. 9, the response from the notary node 912e-3 may be transmitted to one or multiple nodes, such as the user node 912e-1. The user node 912e-1 may, in some embodiments, receive an indication of the signed/verified transaction and execute local chaincode to append/update a local copy of the blockchain, at "33".

In some embodiments, the third-party node 912e-2 may return an indication of the signing/verification to the third-party application server 912d-2 (and/or the application server layer 910d), at "34". According to some embodiments, the third-party application server 912d-2 may process the response from the notary node 912e-3 to structure, generate, and/or trigger a data query, at "35". In some embodiments, the third-party application server 912d-2 may, as part of the procedure for obtaining the transaction signature from the blockchain layer 910e or as a separate process, query the database 940 in furtherance of the execution of the external application service, at "36". In some embodiments, the database 940 (and/or an associated security protocol, application, layer, etc.; not separately shown) may utilize data provided in the query at "36" to identify requested data and/or perform requested data transformation operations, at "37". According to some embodiments, the database 940 (and/or the blockchain layer 910e) may return (e.g., in response to the query/request sent/received at "36") a result of the query/request to the third-party application server 912d-2 (and/or the application server layer 910d), at "38". In some embodiments, the result may comprise an indication of a data element, value, metric, and/or mathematical operation result (e.g., a sum, average, total, difference, etc.).

According to some embodiments, the third-party application server 912d-2 may utilize the data returned from the database 940 to perform one or more calculations and/or computations (e.g., lookups, sorts) in accordance with the instructions/code for the external application service. In some embodiments, the third-party application server 912d-2 may pass a result and/or output from the execution of the external application service instructions/code to the user application server 912d-1, at "39". In such a manner, for example, the user application server 912d-1, the third-party application server 912d-2, and/or the application server layer 910d (e.g., regardless of the configuration of the components thereof) may provide limited access to the external application service either as executed or directed remotely via the third-party device 908 or as executed locally on the application server layer 910d, thereby providing the benefit of the external application service, while maintaining the confidentiality of any private data stored by the database 940. According to some embodiments, the user application server 912d-1 may forward the results/output from the external application service to the user device 904, at "40". In such a manner, for example the user application 942a-1 may provide the output to the user, thereby satisfying the user's request as defined by the first input at "8".

While various components 904, 908, 910d-e, 912d-1, 912d-2, 912e-1, 912e-2, 912e-3, 940, 942a-1, 942a-2 are depicted and described with respect to FIG. 9, fewer or more components and/or different component configurations, quantities, and/or layouts may be utilized in some embodiments. Further, while certain particular blockchain calls and/or processes are described for non-limiting purposes of example, other blockchain processes, layouts, procedures, and/or operations may be conducted in accordance with the desired functionality of the blockchain layer 910e. According to some embodiments, multiple users and/or external application services may be simultaneously engaged with the blockchain layer 910e via the application server layer 910d. In such a manner, for example, multiple users that have access to blockchain data (e.g., for a particular consumer profile record) may asynchronously and/or simultaneously execute a plurality of different third-party/external applications on the blockchain and make use of the output thereof, e.g., while providing only limited access (e.g., via the application server layer 910d) to the blockchain with respect to the external applications.

V. Multivariate AI Smart Card Apparatus & Articles of Manufacture

Figure 10:
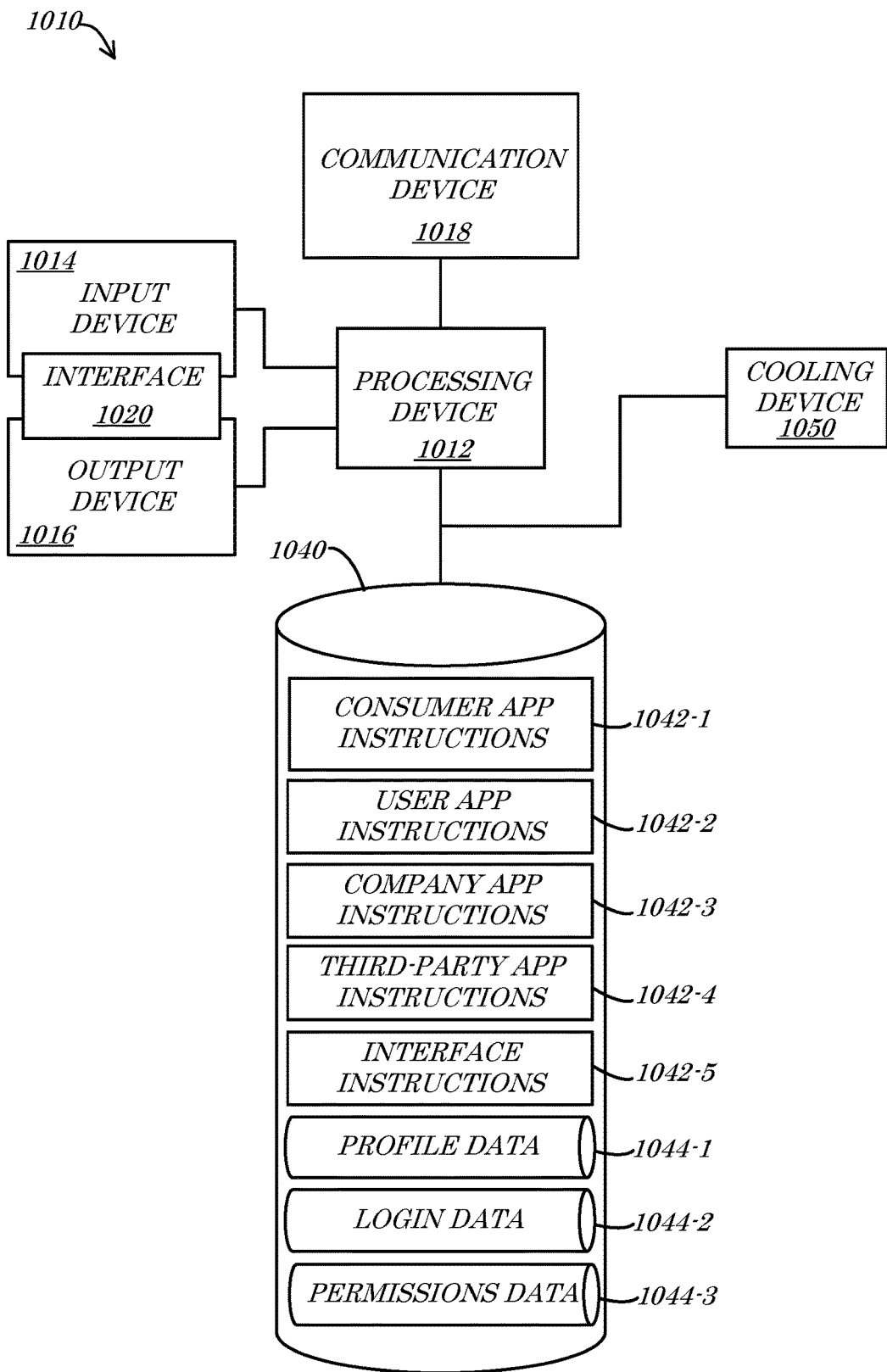
FIG. 10 is a block diagram of an apparatus according to some embodiments.
Figure 11A:
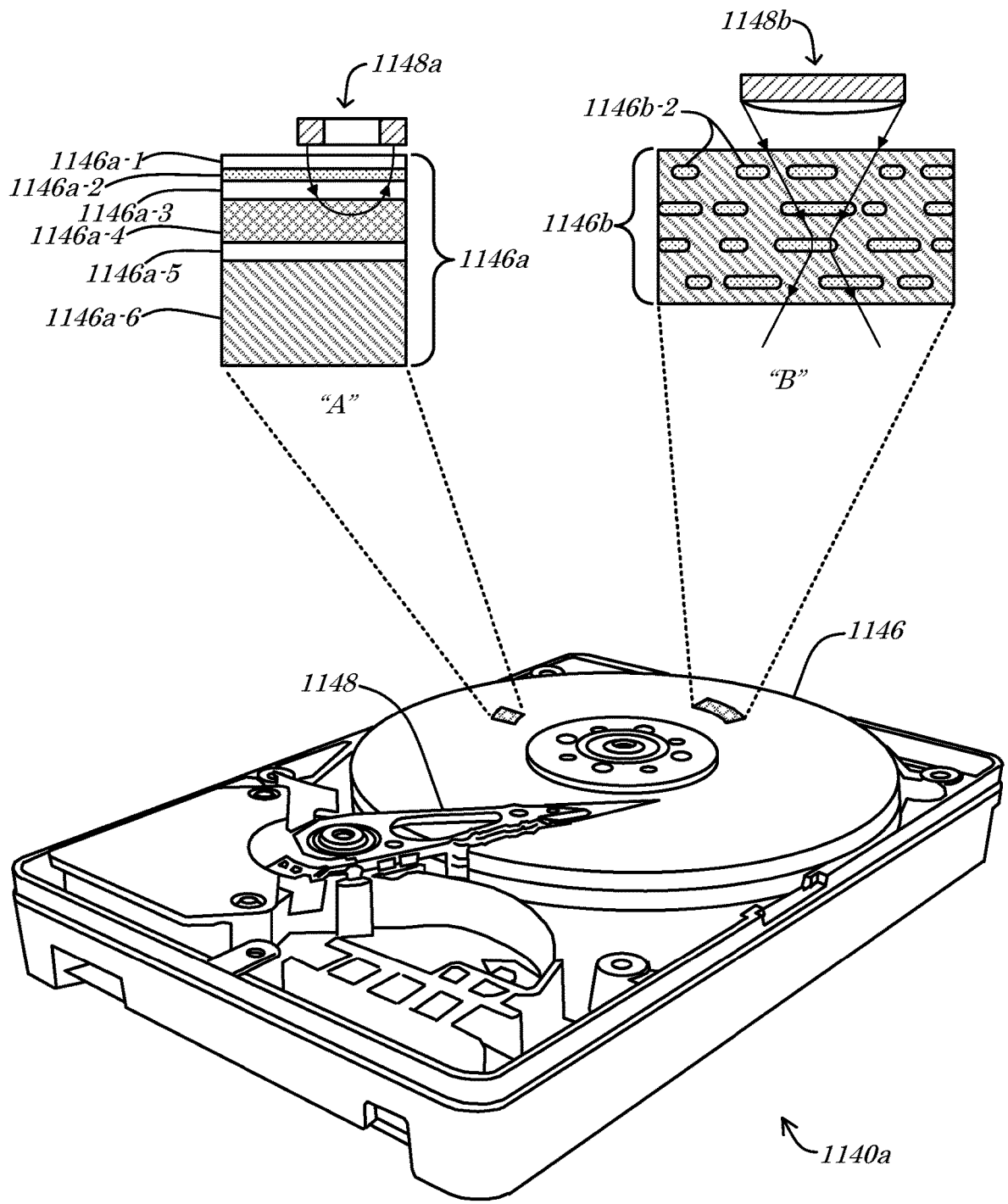
FIG. 11A, FIG. 11B, FIG. 11C, FIG. 11D, and FIG. 11E are perspective diagrams of exemplary data storage devices according to some embodiments.
Figure 11B:
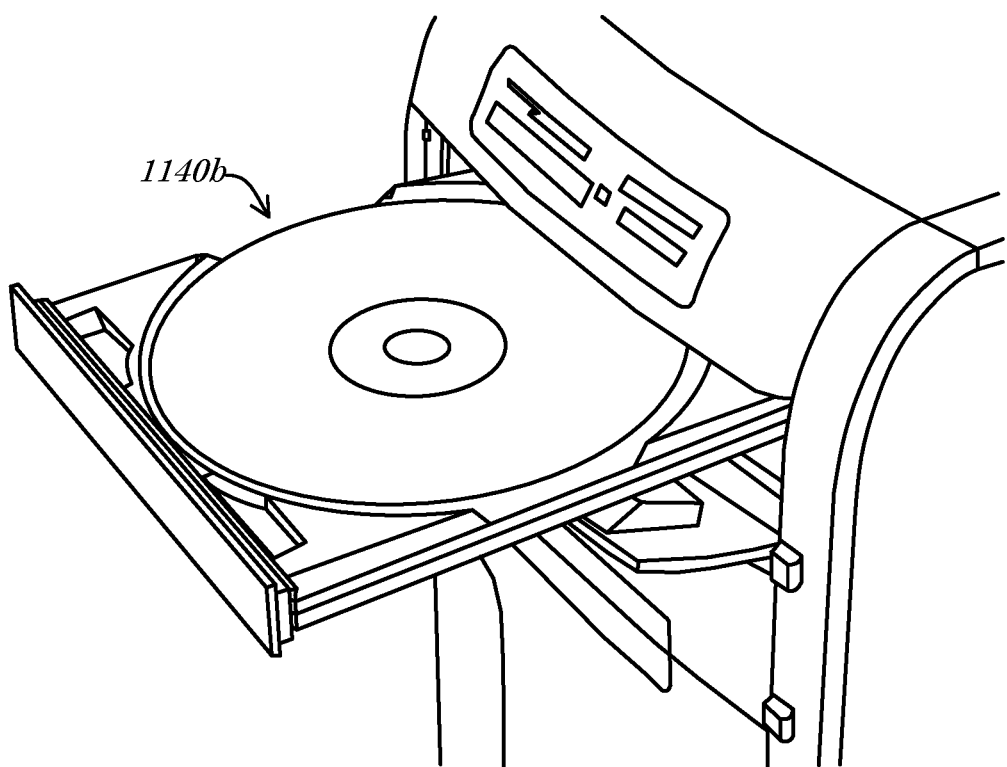
Figure 11C:
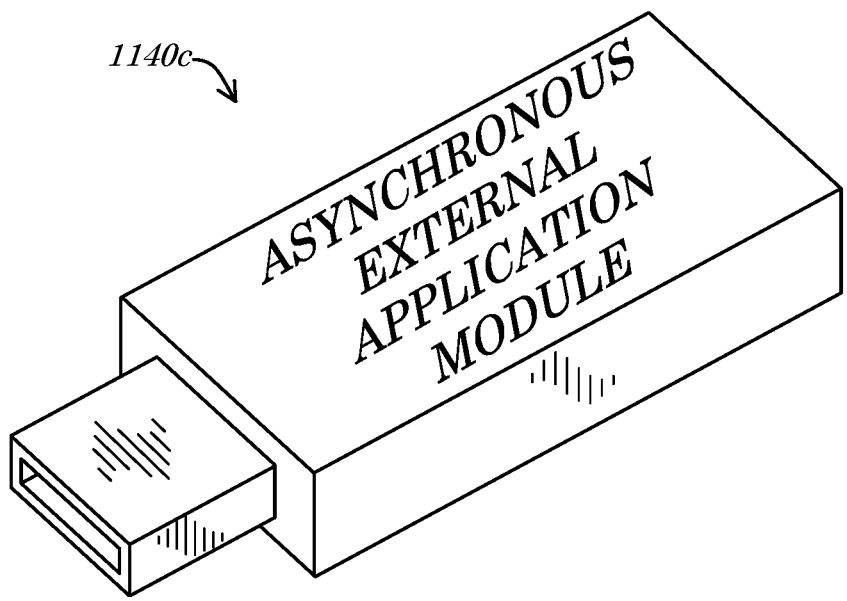
Figure 11D:
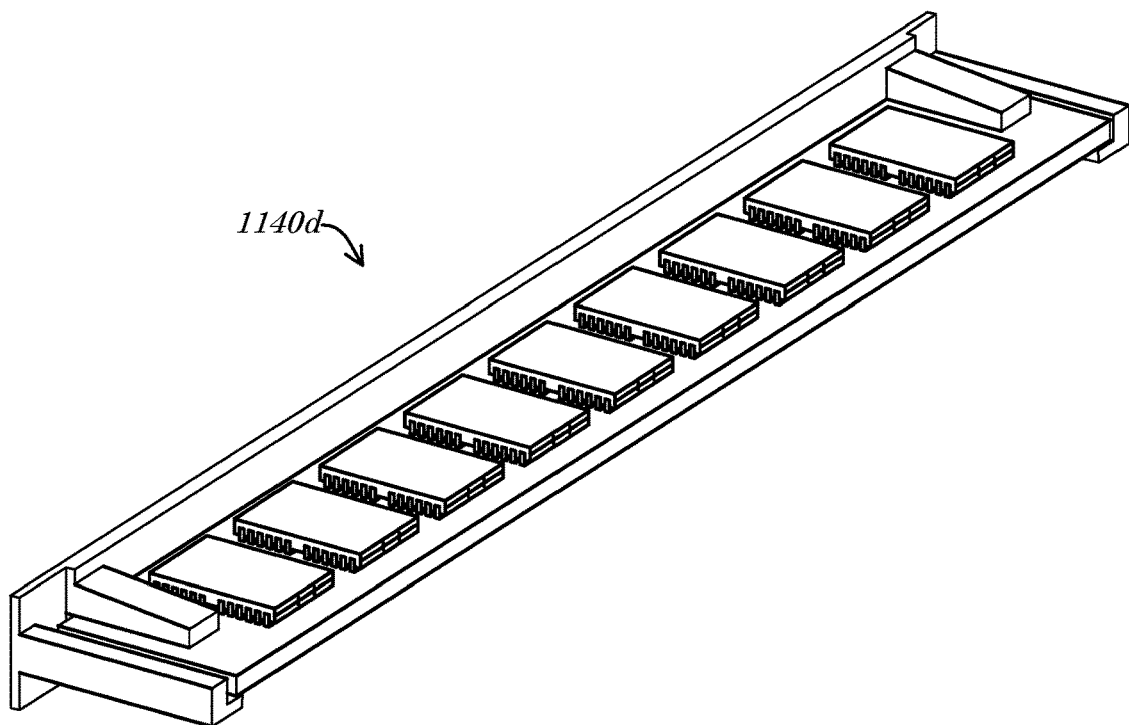
Figure 11E:
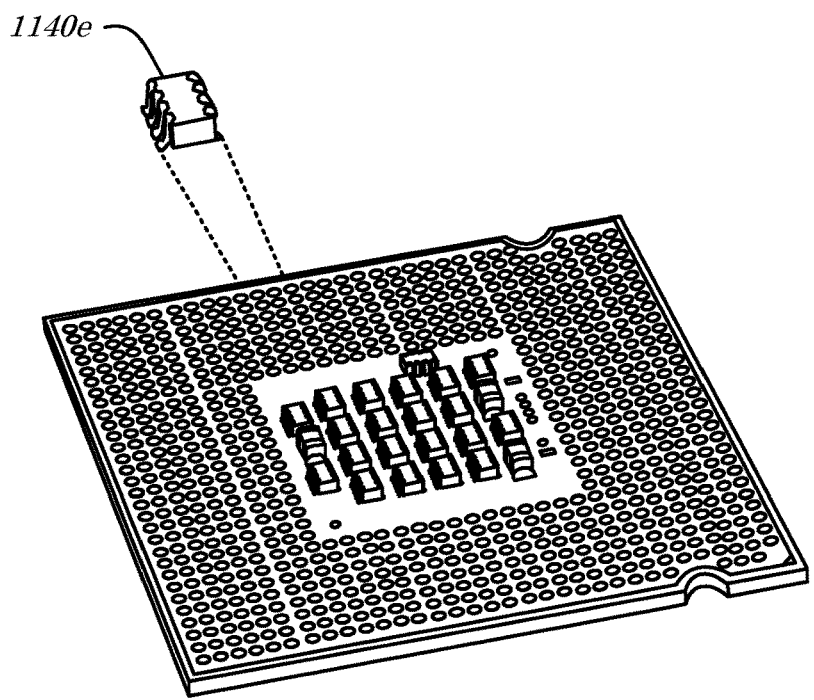

Turning to FIG. 10, a block diagram of an apparatus 1010 according to some embodiments is shown. In some embodiments, the apparatus 1010 may be similar in configuration and/or functionality to one or more of the consumer devices 102a-n, 202, 302, user devices 104a-n, 204, 304, 904, company devices 106a-n, 206, third-party devices 208, 708, 908, the controller devices and/or layers 110, 210a-b, 310a-e, 710a-e, 910d-e of FIG. 1, FIG. 2, FIG. 3, FIG. 7, and/or FIG. 9 herein. The apparatus 1010 may, for example, execute, process, facilitate, and/or otherwise be associated with the methods 400, 500, 600, 800, 900 of FIG. 4, FIG. 5, FIG. 6, FIG. 8, and/or FIG. 9 herein, and/or portions or combinations thereof. In some embodiments, the apparatus 1010 may comprise a processing device 1012, an input device 1014, an output device 1016, a communication device 1018, an interface 1020, a memory device 1040 (storing various programs and/or instructions 1042 and data 1044), and/or a cooling device 1050. According to some embodiments, any or all of the components 1012, 1014, 1016, 1018, 1020, 1040, 1042, 1044, 1050 of the apparatus 1010 may be similar in configuration and/or functionality to any similarly named and/or numbered components described herein. Fewer or more components 1012, 1014, 1016, 1018, 1020, 1040, 1042, 1044, 1050 and/or various configurations of the components 1012, 1014, 1016, 1018, 1020, 1040, 1042, 1044, 1050 may be included in the apparatus 1010 without deviating from the scope of embodiments described herein.

According to some embodiments, the processor 1012 may be or include any type, quantity, and/or configuration of processor that is or becomes known. The processor 1012 may comprise, for example, an Intel® IXP 2800 network processor or an Intel® XEON™ Processor coupled with an Intel® E7501 chipset. In some embodiments, the processor 1012 may comprise multiple inter-connected processors, microprocessors, and/or micro-engines. According to some embodiments, the processor 1012 (and/or the apparatus 1010 and/or other components thereof) may be supplied power via a power supply (not shown) such as a battery, an Alternating Current (AC) source, a Direct Current (DC) source, an AC/DC adapter, solar cells, and/or an inertial generator. In the case that the apparatus 1010 comprises a server, such as a blade server or a virtual co-location device, necessary power may be supplied via a standard AC outlet, power strip, surge protector, and/or Uninterruptible Power Supply (UPS) device.

In some embodiments, the input device 1014 and/or the output device 1016 are communicatively coupled to the processor 1012 (e.g., via wired and/or wireless connections and/or pathways) and they may generally comprise any types or configurations of input and output components and/or devices that are or become known, respectively. The input device 1014 may comprise, for example, a keyboard that allows an operator of the apparatus 1010 to interface with the apparatus 1010 (e.g., by a consumer, to define a consumer profile herein and/or to assign permissions thereto, as described herein). In some embodiments, the input device 1014 may comprise a sensor, such as a camera, sound, light, and/or proximity sensor, configured to measure parameter values and report measured values via signals to the apparatus 1010 and/or the processor 1012. The output device 1016 may, according to some embodiments, comprise a display screen and/or other practicable output component and/or device. The output device 1016 may, for example, provide an interface (such as the interface 1020) via which functionality for asynchronous API-driven external services platform for a blockchain is provided to a user (e.g., via a website and/or mobile application). According to some embodiments, the input device 1014 and/or the output device 1016 may comprise and/or be embodied in a single device, such as a touch-screen monitor.

In some embodiments, the communication device 1018 may comprise any type or configuration of communication device that is or becomes known or practicable. The communication device 1018 may, for example, comprise a Network Interface Card (NIC), a telephonic device, a cellular network device, a router, a hub, a modem, and/or a communications port or cable. In some embodiments, the communication device 1018 may be coupled to receive asynchronous consumer profile data and/or external blockchain application data and/or forward such data to one or more other (e.g., remote) devices (not shown in FIG. 10). The communication device 1018 may, for example, comprise a BLE and/or RF receiver device and/or a camera or other imaging device that acquires data from a user (not separately depicted in FIG. 10) and/or a transmitter device that provides the data to a remote server and/or server or communications layer (also not separately shown in FIG. 10). According to some embodiments, the communication device 1018 may also or alternatively be coupled to the processor 1012. In some embodiments, the communication device 1018 may comprise an IR, RF, Bluetooth™, Near-Field Communication (NFC), and/or Wi-Fi® network device coupled to facilitate communications between the processor 1012 and another device (such as a remote user device, not separately shown in FIG. 10).

The memory device 1040 may comprise any appropriate information storage device that is or becomes known or available, including, but not limited to, units and/or combinations of magnetic storage devices (e.g., a hard disk drive), optical storage devices, and/or semiconductor memory devices such as RAM devices, Read Only Memory (ROM) devices, Single Data Rate Random Access Memory (SDR-RAM), Double Data Rate Random Access Memory (DDR-RAM), and/or Programmable Read Only Memory (PROM). The memory device 1040 may, according to some embodiments, store one or more of consumer application instructions 1042-1, user application instructions 1042-2, company application instructions 1042-3, third-party application instructions 1042-4, interface instructions 1042-5, profile data 1044-1, login data 1044-2, and/or permissions data 1044-3. In some embodiments, the consumer application instructions 1042-1, user application instructions 1042-2, company application instructions 1042-3, third-party application instructions 1042-4, interface instructions 1042-5, profile data 1044-1, login data 1044-2, and/or permissions data 1044-3 may be utilized by the processor 1012 to provide output information via the output device 1016 and/or the communication device 1018.

According to some embodiments, the consumer application instructions 1042-1 may be operable to cause the processor 1012 to process the profile data 1044-1, login data 1044-2, and/or permissions data 1044-3 in accordance with embodiments as described herein. Profile data 1044-1, login data 1044-2, and/or permissions data 1044-3 received via the input device 1014 and/or the communication device 1018 may, for example, be analyzed, sorted, filtered, decoded, decompressed, ranked, scored, plotted, and/or otherwise processed by the processor 1012 in accordance with the consumer application instructions 1042-1. In some embodiments, profile data 1044-1, login data 1044-2, and/or permissions data 1044-3 may be fed by the processor 1012 through one or more mathematical, AI logic (e.g., neural network), and/or statistical formulas and/or models in accordance with the consumer application instructions 1042-1 to define, enhance, and/or share consumer profile information, as described herein.

In some embodiments, the user application instructions 1042-2 may be operable to cause the processor 1012 to process the profile data 1044-1, login data 1044-2, and/or permissions data 1044-3 in accordance with embodiments as described herein. Profile data 1044-1, login data 1044-2, and/or permissions data 1044-3 received via the input device 1014 and/or the communication device 1018 may, for example, be analyzed, sorted, filtered, decoded, decompressed, ranked, scored, plotted, and/or otherwise processed by the processor 1012 in accordance with the user application instructions 1042-2. In some embodiments, profile data 1044-1, login data 1044-2, and/or permissions data 1044-3 may be fed by the processor 1012 through one or more mathematical, AI logic (e.g., neural network), and/or statistical formulas and/or models in accordance with the user application instructions 1042-2 to asynchronously access consumer profile information and/or selectively enable limited blockchain access to one or more external applications, as described herein.

According to some embodiments, the company application instructions 1042-3 may be operable to cause the processor 1012 to process the profile data 1044-1, login data 1044-2, and/or permissions data 1044-3 in accordance with embodiments as described herein. Profile data 1044-1, login data 1044-2, and/or permissions data 1044-3 received via the input device 1014 and/or the communication device 1018 may, for example, be analyzed, sorted, filtered, decoded, decompressed, ranked, scored, plotted, and/or otherwise processed by the processor 1012 in accordance with the company application instructions 1042-3. In some embodiments, profile data 1044-1, login data 1044-2, and/or permissions data 1044-3 may be fed by the processor 1012 through one or more mathematical, AI logic (e.g., neural network), and/or statistical formulas and/or models in accordance with the company application instructions 1042-3 to asynchronously access consumer profile information and/or selectively enable limited blockchain access to one or more external applications, as described herein.

In some embodiments, the third-party application instructions 1042-4 may be operable to cause the processor 1012 to process the profile data 1044-1, login data 1044-2, and/or permissions data 1044-3 in accordance with embodiments as described herein. Profile data 1044-1, login data 1044-2, and/or permissions data 1044-3 received via the input device 1014 and/or the communication device 1018 may, for example, be analyzed, sorted, filtered, decoded, decompressed, ranked, scored, plotted, and/or otherwise processed by the processor 1012 in accordance with the third-party application instructions 1042-4. In some embodiments, profile data 1044-1, login data 1044-2, and/or permissions data 1044-3 may be fed by the processor 1012 through one or more mathematical, AI logic (e.g., neural network), and/or statistical formulas and/or models in accordance with the third-party application instructions 1042-4 to execute an external application on a private blockchain system via an application services layer, as described herein.

According to some embodiments, the interface instructions 1042-5 may be operable to cause the processor 1012 to process the profile data 1044-1, login data 1044-2, and/or permissions data 1044-3 in accordance with embodiments as described herein. Profile data 1044-1, login data 1044-2, and/or permissions data 1044-3 received via the input device 1014 and/or the communication device 1018 may, for example, be analyzed, sorted, filtered, decoded, decompressed, ranked, scored, plotted, and/or otherwise processed by the processor 1012 in accordance with the interface instructions 1042-5. In some embodiments, profile data 1044-1, login data 1044-2, and/or permissions data 1044-3 may be fed by the processor 1012 through one or more mathematical, AI logic (e.g., neural network), and/or statistical formulas and/or models in accordance with the interface instructions 1042-5 to provide various interfaces to consumers, companies, and/or other users to facilitate entry of consumer profile data, login credentials, external application data, etc., as described herein.

According to some embodiments, the apparatus 1010 may comprise the cooling device 1050. According to some embodiments, the cooling device 1050 may be coupled (physically, thermally, and/or electrically) to the processor 1012 and/or to the memory device 1040. The cooling device 1050 may, for example, comprise a fan, heat sink, heat pipe, radiator, cold plate, and/or other cooling component or device or combinations thereof, configured to remove heat from portions or components of the apparatus 1010.

Any or all of the exemplary instructions and data types described herein and other practicable types of data may be stored in any number, type, and/or configuration of memory devices that is or becomes known. The memory device 1040 may, for example, comprise one or more data tables or files, databases, table spaces, registers, and/or other storage structures. In some embodiments, multiple databases and/or storage structures (and/or multiple memory devices 1040) may be utilized to store information associated with the apparatus 1010. According to some embodiments, the memory device 1040 may be incorporated into and/or otherwise coupled to the apparatus 1010 (e.g., as shown) or may simply be accessible to the apparatus 1010 (e.g., externally located and/or situated).

Referring to FIG. 11A, FIG. 11B, FIG. 11C, FIG. 11D, and FIG. 11E, perspective diagrams of exemplary data storage devices 1140*a-e* according to some embodiments are shown. The data storage devices 1140*a-e* may, for example, be utilized to store instructions and/or data such as the consumer application instructions 1042-1, user application instructions 1042-2, company application instructions 1042-3, third-party application instructions 1042-4, interface instructions 1042-5, profile data 1044-1, login data 1044-2, and/or permissions data 1044-3, each of which is presented in reference to FIG. 10 herein. In some embodiments, instructions stored on the data storage devices 1140*a-e* may, when executed by a processor, cause the implementation of and/or facilitate the methods 400, 500, 600, 800, 900 of FIG. 4, FIG. 5, FIG. 6, FIG. 8, and/or FIG. 9 herein, and/or portions or combinations thereof.

According to some embodiments, the first data storage device 1140*a* may comprise one or more various types of internal and/or external hard drives. The first data storage device 1140*a* may, for example, comprise a data storage medium 1146 that is read, interrogated, and/or otherwise communicatively coupled to and/or via a disk reading device 1148. In some embodiments, the first data storage device 1140*a* and/or the data storage medium 1146 may be configured to store information utilizing one or more magnetic, inductive, and/or optical means (e.g., magnetic, inductive, and/or optical-encoding). The data storage medium 1146, depicted as a first data storage medium 1146*a* for example (e.g., breakout cross-section "A"), may comprise one or more of a polymer layer 1146*a*-1, a magnetic data storage layer 1146*a*-2, a non-magnetic layer 1146*a*-3, a magnetic base layer 1146a-4, a contact layer 1146a-5, and/or a substrate layer 1146a-6. According to some embodiments, a magnetic read head 1148a may be coupled and/or disposed to read data from the magnetic data storage layer 1146a-2.

In some embodiments, the data storage medium 1146, depicted as a second data storage medium 1146b for example (e.g., breakout cross-section "B"), may comprise a plurality of data points 1146b-2 disposed with the second data storage medium 1146b. The data points 1146b-2 may, in some embodiments, be read and/or otherwise interfaced with via a laser-enabled read head 1148b disposed and/or coupled to direct a laser beam through the second data storage medium 1146b.

In some embodiments, the second data storage device 1140b may comprise a CD, CD-ROM, DVD, Blu-Ray™ Disc, and/or other type of optically-encoded disk and/or other storage medium that is or becomes know or practicable. In some embodiments, the third data storage device 1140c may comprise a USB keyfob, dongle, and/or other type of flash memory data storage device that is or becomes know or practicable. In some embodiments, the fourth data storage device 1140d may comprise RAM of any type, quantity, and/or configuration that is or becomes practicable and/or desirable. In some embodiments, the fourth data storage device 1140d may comprise an off-chip cache such as a Level 2 (L2) cache memory device. According to some embodiments, the fifth data storage device 1140e may comprise an on-chip memory device such as a Level 1 (L1) cache memory device.

The data storage devices 1140a-e may generally store program instructions, code, and/or modules that, when executed by a processing device cause a particular machine to function in accordance with one or more embodiments described herein. The data storage devices 1140a-e depicted in FIG. 11A, FIG. 11B, FIG. 11C, FIG. 11D, and FIG. 11E are representative of a class and/or subset of computer-readable media that are defined herein as "computer-readable memory" (e.g., non-transitory memory devices as opposed to transmission devices or media).

VI. Rules of Interpretation

Throughout the description herein and unless otherwise specified, the following terms may include and/or encompass the example meanings provided. These terms and illustrative example meanings are provided to clarify the language selected to describe embodiments both in the specification and in the appended claims, and accordingly, are not intended to be generally limiting. While not generally limiting and while not limiting for all described embodiments, in some embodiments, the terms are specifically limited to the example definitions and/or examples provided. Other terms are defined throughout the present description.

Some embodiments described herein are associated with a "user device" or a "network device". As used herein, the terms "user device" and "network device" may be used interchangeably and may generally refer to any device that can communicate via a network. Examples of user or network devices include a PC, a workstation, a server, a printer, a scanner, a facsimile machine, a copier, a Personal Digital Assistant (PDA), a storage device (e.g., a disk drive), a hub, a router, a switch, and a modem, a video game console, or a wireless phone. User and network devices may comprise one or more communication or network components. As used herein, a "user" may generally refer to any individual and/or entity that operates a user device. Users may comprise, for example, customers, consumers, product underwriters, product distributors, customer service representatives, agents, brokers, etc.

As used herein, the term "network component" may refer to a user or network device, or a component, piece, portion, or combination of user or network devices. Examples of network components may include a Static Random Access Memory (SRAM) device or module, a network processor, and a network communication path, connection, port, or cable.

In addition, some embodiments are associated with a "network" or a "communication network". As used herein, the terms "network" and "communication network" may be used interchangeably and may refer to any object, entity, component, device, and/or any combination thereof that permits, facilitates, and/or otherwise contributes to or is associated with the transmission of messages, packets, signals, and/or other forms of information between and/or within one or more network devices. Networks may be or include a plurality of interconnected network devices. In some embodiments, networks may be hard-wired, wireless, virtual, neural, and/or any other configuration of type that is or becomes known. Communication networks may include, for example, one or more networks configured to operate in accordance with the Fast Ethernet LAN transmission standard 802.3-2002® published by the Institute of Electrical and Electronics Engineers (IEEE). In some embodiments, a network may include one or more wired and/or wireless networks operated in accordance with any communication standard or protocol that is or becomes known or practicable.

As used herein, the terms "information" and "data" may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard as defined by "Internet Protocol Version 6 (IPv6) Specification" RFC 1883, published by the Internet Engineering Task Force (IETF), Network Working Group, S. Deering et al. (December 1995). Information may, according to some embodiments, be compressed, encoded, encrypted, and/or otherwise packaged or manipulated in accordance with any method that is or becomes known or practicable.

In addition, some embodiments described herein are associated with an "indication". As used herein, the term "indication" may be used to refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

"Determining" something can be performed in a variety of manners and therefore the term "determining" (and like terms) includes calculating, computing, deriving, looking up (e.g., in a table, database or data structure), ascertaining and the like.

It will be readily apparent that the various methods and algorithms described herein may be implemented by, e.g., appropriately and/or specially-programmed computers and/or computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software.

A "processor" generally means any one or more microprocessors, CPU devices, computing devices, microcontrollers, digital signal processors, or like devices, as further described herein.

The term "computer-readable medium" refers to any medium that participates in providing data (e.g., instructions or other information) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave, or any other medium from which a computer can read.

The term "computer-readable memory" may generally refer to a subset and/or class of computer-readable medium that does not include transmission media such as waveforms, carrier waves, electromagnetic emissions, etc. Computer-readable memory may typically include physical media upon which data (e.g., instructions or other information) are stored, such as optical or magnetic disks and other persistent memory, DRAM, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, computer hard drives, backup tapes, Universal Serial Bus (USB) memory devices, and the like.

Various forms of computer readable media may be involved in carrying data, including sequences of instructions, to a processor. For example, sequences of instruction (i) may be delivered from RAM to a processor, (ii) may be carried over a wireless transmission medium, and/or (iii) may be formatted according to numerous formats, standards or protocols, such as Bluetooth™, TDMA, CDMA, 3G.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device that accesses data in such a database.

The present invention can be configured to work in a network environment including a computer that is in communication, via a communications network, with one or more devices. The computer may communicate with the devices directly or indirectly, via a wired or wireless medium such as the Internet, LAN, WAN or Ethernet, Token Ring, or via any appropriate communications means or combination of communications means. Each of the devices may comprise computers, such as those based on the Intel® Pentium® or Centrino™ processor, that are adapted to communicate with the computer. Any number and type of machines may be in communication with the computer.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicants intend to file additional applications to pursue patents for subject matter that has been disclosed and enabled but not claimed in the present application.

It will be understood that various modifications can be made to the embodiments of the present disclosure herein without departing from the scope thereof. Therefore, the above description should not be construed as limiting the disclosure, but merely as embodiments thereof. Those skilled in the art will envision other modifications within the scope of the invention as defined by the claims appended hereto.

What is claimed is:

1. A system for providing asynchronous Application Programming Interface (API)-driven external application services for a blockchain, comprising:
a blockchain application server defining an API layer and comprising an electronic processing device; and
a non-transitory data storage device in communication with the blockchain application server, the non-transitory data storage device storing instructions that when executed by the electronic processing device, result in:
receiving, from a first remote device operated by a first user and at the API layer, first user login credentials;
authenticating, by the electronic processing device, the first user login credentials;
providing, by the electronic processing device and to the first remote device, and in response to the authenticating of the first user login credentials, a first interface;
receiving, from the first remote device and via the first interface, data defining a first user profile record, the first user profile record comprising (i) information identifying the first user and (ii) information defining at least one access right granted by the first user to at least one authorized user;
providing, from the API layer and to a blockchain system, an indication of the data defining the first user profile record;
receiving, from a second remote device operated by a second user and at the API layer, second user login credentials;
authenticating, by the electronic processing device, the second user login credentials;
verifying, by the electronic processing device, that the at least one authorized user comprises the second user;
providing, by the electronic processing device and to the second remote device, and in response to the authenticating of the second user login credentials and the verifying that the at least one authorized user comprises the second user, a second interface;
receiving, by the electronic processing device and via one of the first and second interfaces, a request to execute an external application service;
identifying, by the electronic processing device, instructions defining the external application service;
executing, by the electronic processing device, the instructions defining the external application service, wherein the executing comprises selectively accessing data stored by the blockchain system and results in a definition of an external application service output; and
providing, by the electronic processing device and via the one of the first and second interfaces, the external application service output.

2. The system of claim 1, wherein the identifying of the instructions defining the external application service comprises:
identifying an external entity corresponding to the external application service;
querying the external entity utilizing information stored in relation to at least one of the first and second user; and
receiving, from the external entity and in response to the querying, an indication that the external application service is authorized to be executed.

3. The system of claim 1, wherein the instructions, when executed by the electronic processing device, further result in:
providing, from the API layer and to the blockchain system, an indication of the authentication of the first user login credentials.

4. The system of claim 1, wherein the instructions, when executed by the electronic processing device, further result in:
providing, from the API layer and to the blockchain system, an indication of at least one of the authentication of the second user login credentials and the verification that the at least one authorized user comprises the second user.

5. The system of claim 1, wherein the instructions, when executed by the electronic processing device, further result in:
providing, from the API layer and to the blockchain system, an indication of the external application service output.

6. The system of claim 1, wherein the instructions, when executed by the electronic processing device, further result in:
providing, via the second interface and to the second remote device, and by accessing the blockchain system, at least a portion of the first user profile record.

7. The system of claim 1, wherein the first user login credentials are provided via a smart card storing information identifying the first user.

8. The system of claim 1, wherein communications between the system and the remote devices are brokered by a web application layer comprising at least one web server.

9. The system of claim 1, wherein the external application service output comprises at least one of (i) an underwriting appetite metric, (ii) a loss metric, (iii) a business classification metric, and (iv) a risk metric, and wherein the instructions defining the external application service comprise instructions defining rules for a respective at least one of (i) calculating the underwriting appetite metric based on data stored in the first user profile record, (ii) calculating the loss metric based on data stored in the first user profile record, (iii) calculating the business classification metric based on data stored in the first user profile record, and (iv) calculating the risk metric based on data stored in the first user profile record.

10. The system of claim 1, wherein the external application service output comprises at least one of (i) a data completeness metric and (ii) a location intelligence metric, and wherein the instructions defining the external application service comprise instructions defining rules for a respective at least one of (i) calculating the data completeness metric based on data stored in the first user profile record and (ii) calculating the location intelligence metric based on data stored in the first user profile record.

11. The system of claim 1, wherein the blockchain system is accessible only through the API layer of the blockchain application server.

12. A method for providing asynchronous Application Programming Interface (API)-driven external application services for a blockchain, comprising:
  receiving, from a first remote device operated by a first user and at an API layer provided by a blockchain application server comprising an electronic processing device, first user login credentials;
  authenticating, by the electronic processing device, the first user login credentials;
  providing, by the electronic processing device and to the first remote device, and in response to the authenticating of the first user login credentials, a first interface;
  receiving, from the first remote device and via the first interface, data defining a first user profile record, the first user profile record comprising (i) information identifying the first user and (ii) information defining at least one access right granted by the first user to at least one authorized user;
  providing, from the API layer and to a blockchain system, an indication of the data defining the first user profile record;
  receiving, from a second remote device operated by a second user and at the API layer, second user login credentials;
  authenticating, by the electronic processing device, the second user login credentials;
  verifying, by the electronic processing device, that the at least one authorized user comprises the second user;
  providing, by the electronic processing device and to the second remote device, and in response to the authenticating of the second user login credentials and the verifying that the at least one authorized user comprises the second user, a second interface;
  receiving, by the electronic processing device and via one of the first and second interfaces, a request to execute an external application service;
  identifying, by the electronic processing device, instructions defining the external application service;
  executing, by the electronic processing device, the instructions defining the external application service, wherein the executing comprises selectively accessing data stored by the blockchain system and results in a definition of an external application service output; and
  providing, by the electronic processing device and via the one of the first and second interfaces, the external application service output.

13. The method of claim 12, wherein the identifying of the instructions defining the external application service comprises:
  identifying an external entity corresponding to the external application service;
  querying the external entity utilizing information stored in relation to at least one of the first and second user; and
  receiving, from the external entity and in response to the querying, an indication that the external application service is authorized to be executed.

14. The method of claim 12, further comprising:
  providing, from the API layer and to the blockchain system, an indication of the authentication of the first user login credentials.

15. The method of claim 12, further comprising:
  providing, from the API layer and to the blockchain system, an indication of at least one of the authentication of the second user login credentials and the verification that the at least one authorized user comprises the second user.

16. The method of claim 12, further comprising:
  providing, from the API layer and to the blockchain system, an indication of the external application service output.

17. The method of claim 12, further comprising:
  providing, via the second interface and to the second remote device, and by accessing the blockchain system, at least a portion of the first user profile record.

18. The method of claim 12, wherein the first user login credentials are provided via a smart card storing information identifying the first user.

19. The method of claim 12, wherein communications between the system and the remote devices are brokered by a web application layer comprising at least one web server.

20. The method of claim 12, wherein the external application service output comprises at least one of (i) an underwriting appetite metric, (ii) a loss metric, (iii) a business classification metric, and (iv) a risk metric, and wherein the instructions defining the external application service comprise instructions defining rules for a respective at least one of (i) calculating the underwriting appetite metric based on data stored in the first user profile record, (ii) calculating the loss metric based on data stored in the first user profile record, (iii) calculating the business classification metric based on data stored in the first user profile record, and (iv) calculating the risk metric based on data stored in the first user profile record.

21. The method of claim 12, wherein the external application service output comprises at least one of (i) a data completeness metric and (ii) a location intelligence metric, and wherein the instructions defining the external application service comprise instructions defining rules for a respective at least one of (i) calculating the data completeness metric based on data stored in the first user profile record and (ii) calculating the location intelligence metric based on data stored in the first user profile record.

22. The method of claim 12, wherein the blockchain system is accessible only through the API layer of the blockchain application server.

* * * * *